US012658038B2

(12) United States Patent
Zhou et al.

(10) Patent No.: US 12,658,038 B2
(45) Date of Patent: Jun. 16, 2026

(54) CONTROL METHOD AND APPARATUS FOR TRAFFIC LIGHT, AND ROAD NETWORK SYSTEM, ELECTRONIC DEVICE AND MEDIUM

(71) Applicant: BOE TECHNOLOGY GROUP CO., LTD., Beijing (CN)

(72) Inventors: Xibo Zhou, Beijing (CN); Jinxiao Wen, Beijing (CN); Zhuoshi Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 136 days.

(21) Appl. No.: 18/580,368

(22) PCT Filed: Apr. 28, 2022

(86) PCT No.: PCT/CN2022/089932
§ 371 (c)(1),
(2) Date: Jan. 18, 2024

(87) PCT Pub. No.: WO2023/206248
PCT Pub. Date: Nov. 2, 2023

(65) Prior Publication Data
US 2025/0095484 A1 Mar. 20, 2025

(51) Int. Cl.
*G08G 1/083* (2006.01)
*G08G 1/01* (2006.01)
*G08G 1/08* (2006.01)

(52) U.S. Cl.
CPC ........... *G08G 1/083* (2013.01); *G08G 1/0129* (2013.01); *G08G 1/0133* (2013.01); *G08G 1/08* (2013.01)

(58) Field of Classification Search
CPC .... G08G 1/083; G08G 1/0129; G08G 1/0133; G08G 1/08
(Continued)

(56) References Cited

U.S. PATENT DOCUMENTS 6,084,543 A * 7/2000 Iizuka ................ G01C 21/3644 701/437
8,504,270 B2 * 8/2013 Busch .................. G08G 1/0145 701/119
(Continued)

FOREIGN PATENT DOCUMENTS

CN 105825677 A 8/2016
CN 106251664 A 12/2016
(Continued)

OTHER PUBLICATIONS

International Search Report in PCT/CN2022/089932 in Chinese dated Jan. 18, 2023 with English translation.
(Continued)

*Primary Examiner* — Brian A Zimmerman
*Assistant Examiner* — Thang D Tran
(74) *Attorney, Agent, or Firm* — Collard & Roe, P.C.

(57) ABSTRACT

A control method of a traffic light in a road network, an apparatus, an electronic device and a computer-readable storage medium. The road network includes a plurality of road sections and an intersection formed by the plurality of road sections, the traffic light is configured to regulate traffic at the intersection, and the control method includes: acquiring a piece of real-time road condition status information of the plurality of road sections connected to the intersection in the road network; selecting a next hop phase of the traffic light from a plurality of preset phases of the traffic light according to the road condition status information; and controlling a phase of the traffic light to be updated to the next hop phase.

19 Claims, 14 Drawing Sheets

(58) Field of Classification Search
USPC .......................................................... 340/909
See application file for complete search history.

(56) References Cited

U.S. PATENT DOCUMENTS

| | | | | |
|---|---|---|---|---|
| 8,909,462 | B2 * | 12/2014 | Lection | G08G 1/087 701/119 |
| 9,239,241 | B2 * | 1/2016 | Sumizawa | G01C 21/34 |
| 10,032,372 | B1 * | 7/2018 | De Nava | G08G 1/096716 |
| 10,176,712 | B1 * | 1/2019 | Martins | G08G 1/09 |
| 10,930,146 | B1 * | 2/2021 | Bejugam | G08G 1/07 |
| 11,069,234 | B1 * | 7/2021 | Mulligan | G08G 1/087 |
| 11,436,921 | B2 | 9/2022 | Li | |
| 2007/0118281 | A1 * | 5/2007 | Adam | G08G 1/09675 340/995.13 |
| 2010/0070253 | A1 * | 3/2010 | Hirata | G08G 1/0104 703/8 |
| 2012/0038490 | A1 * | 2/2012 | Verfuerth | G08G 1/0133 340/917 |
| 2012/0056756 | A1 * | 3/2012 | Yester | G08G 1/0967 340/901 |
| 2014/0368358 | A1 * | 12/2014 | Xie | G08G 1/0116 340/922 |
| 2016/0042641 | A1 * | 2/2016 | Smith | G08G 1/0133 340/917 |
| 2016/0215747 | A1 * | 7/2016 | Huber | F02D 29/02 |
| 2016/0328963 | A1 * | 11/2016 | Yao | G08G 1/0133 |
| 2017/0186314 | A1 * | 6/2017 | Bernhardt | H04L 67/12 |
| 2018/0075740 | A1 * | 3/2018 | Radomy | G08G 1/07 |
| 2018/0096595 | A1 * | 4/2018 | Janzen | G06V 10/94 |
| 2018/0122227 | A1 * | 5/2018 | Mubarek | G08G 1/0133 |
| 2018/0126995 | A1 * | 5/2018 | Caballero De Ita | G08G 1/0145 |
| 2018/0151064 | A1 * | 5/2018 | Xu | G08G 1/0125 |
| 2018/0286228 | A1 * | 10/2018 | Xu | G08G 1/0145 |
| 2018/0293887 | A1 * | 10/2018 | Brodski | G08G 1/0116 |
| 2019/0122546 | A1 * | 4/2019 | Lu | G08G 1/0133 |
| 2019/0251838 | A1 * | 8/2019 | Bernhardt | G08G 1/096741 |
| 2020/0035096 | A1 * | 1/2020 | Sun | G08G 1/095 |
| 2020/0160701 | A1 * | 5/2020 | Mobasser | G08G 1/0145 |
| 2020/0250987 | A1 * | 8/2020 | Zhou | B60W 30/0956 |
| 2021/0065542 | A1 * | 3/2021 | Ji | G08G 1/0112 |
| 2021/0134151 | A1 * | 5/2021 | Khalid | G08G 1/0145 |
| 2022/0092874 | A1 * | 3/2022 | Gao | G08G 1/052 |
| 2022/0092973 | A1 * | 3/2022 | Mohamad Alizadeh Shabestary | G08G 1/04 |
| 2022/0101728 | A1 * | 3/2022 | Wolf | G08G 1/096844 |
| 2023/0192089 | A1 * | 6/2023 | Xu | B60W 30/181 701/26 |
| 2023/0243660 | A1 * | 8/2023 | Zeng | G01C 21/3676 701/414 |

FOREIGN PATENT DOCUMENTS

| | | | | |
|---|---|---|---|---|
| CN | 109671282 | | * | 4/2019 |
| CN | 109671282 | A | | 4/2019 |
| CN | 110021182 | | * | 7/2019 |
| CN | 110021182 | A | | 7/2019 |
| CN | 111243297 | A | | 6/2020 |
| CN | 111564048 | A | | 8/2020 |
| CN | 111613072 | A | | 9/2020 |
| CN | 112216128 | A | | 1/2021 |
| JP | 2003303398 | A | | 10/2003 |
| WO | 2019165616 | A1 | | 9/2019 |

OTHER PUBLICATIONS

Written Opinion of the International Searching Authority in PCT/CN2022/089932 in Chinese dated Jan. 18, 2023.

Chinese Office Action in Chinese Application No. 2022800010237 in Chinese dated Apr. 1, 2026 with English translation.

* cited by examiner

| | A1 | A2 |
|---|---|---|
| Combined Manner 1 | travel straight in east-west | travel straight in east-west |
| Combined Manner 2 | travel straight in east-west | turn left in east-west |
| Combined Manner 3 | turn left in east-west | travel straight in east-west |
| Combined Manner 4 | turn left in south-north | travel straight in east-west |
| Combined Manner 5 | travel straight in east-west | turn left in south-north |
| Combined Manner 6 | turn left in south-north | turn left in south-north |
| Combined Manner 7 | travel straight in south-north | travel straight in south-north |

FIG. 9B

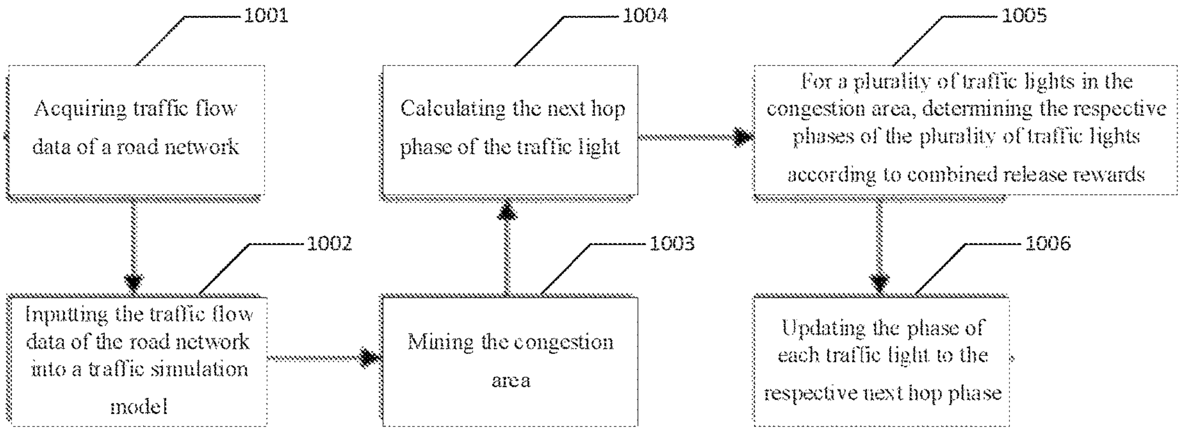

FIG. 10A

CONTROL METHOD AND APPARATUS FOR TRAFFIC LIGHT, AND ROAD NETWORK SYSTEM, ELECTRONIC DEVICE AND MEDIUM

CROSS REFERENCE TO RELATED APPLICATIONS

This application is the National Stage of PCT/CN2022/089932 filed on Apr. 28, 2022, the disclosure of which is incorporated by reference.

TECHNICAL FIELD

Embodiments of the present disclosure relate to a control method of a traffic light, an apparatus, a road network system, an electronic device and a medium.

BACKGROUND

With the development of technologies such as the Internet of Things and artificial intelligence, the application level of urban informatization continues to rise, and the construction of smart cities has become an important trend for future social development. Based on the full integration, excavation, and utilization of information technology and resources, smart cities achieve the precise management of various fields of the city and the intensive utilization of urban resources. For the residents and managers of cities, the smart public transportation system is one of the important goals of smart city construction. To solve the problem of urban transportation decision-making and planning, it is necessary to comprehensively consider the traffic condition, urban road network and traffic light coordination.

SUMMARY

At least one embodiment of the disclosure provides a control method of a traffic light in a road network, the road network comprises a plurality of road sections and an intersection formed by the plurality of road sections, the traffic light is configured to regulate traffic at the intersection, and the control method comprises: acquiring a piece of real-time road condition status information of the plurality of road sections connected to the intersection in the road network; selecting a next hop phase of the traffic light from a plurality of preset phases of the traffic light according to the road condition status information; and controlling a phase of the traffic light to be updated to the next hop phase.

For example, in the control method provided by an embodiment of the present disclosure, the control method further comprises: providing the next hop phase to a map display page to cause the map display page to display the next hop phase.

For example, in the control method provided by an embodiment of the present disclosure, the control method further comprises: judging whether there is an accident lane where a traffic accident occurs in the road network according to the road condition status information; providing a piece of accident information of the traffic accident to the map display page in response to the presence of the accident lane in the road network; the accident information comprises at least one selected from a group consisting of: an expected duration to pass through the accident lane, an expected duration for the traffic accident to be resolved, a piece of lane information of the accident lane, and a phase of a traffic light of an intersection connected to the accident lane.

For example, in the control method provided by an embodiment of the present disclosure, selecting the next hop phase of the traffic light from the plurality of preset phases of the traffic light according to the road condition status information comprises: acquiring a processing strategy for the traffic accident in response to the presence of the accident lane in the road network; and selecting the next hop phase of the traffic light from the plurality of preset phases of the traffic light according to the processing strategy.

For example, in the control method provided by an embodiment of the present disclosure, the road condition status information comprises a piece of current driving information of each vehicle in the plurality of road sections, each of the plurality of road sections comprises at least one lane, and selecting the next hop phase of the traffic light from the plurality of preset phases of the traffic light according to the road condition status information comprises: determining, for each of the plurality of preset phases, at least one first lane corresponding to each of the plurality of preset phases, wherein the at least one first lane corresponding to each of the plurality of preset phases is a lane of one or more vehicles released to arrive at the intersection for each of the plurality of preset phases; calculating, according to a piece of current driving information of each vehicle in the at least one first lane, an expected delay duration generated by a vehicle in the at least one first lane if the vehicle is prohibited from passing when arriving at the intersection; and selecting the next hop phase of the traffic light from the plurality of preset phases of the traffic light according to the expected delay duration generated for each of the plurality of preset phases.

For example, in the control method provided by an embodiment of the present disclosure, selecting the next hop phase of the traffic light from the plurality of preset phases of the traffic light according to the expected delay duration generated by each of the plurality of preset phases comprises: determining, according to the expected delay duration respectively generated for each of the plurality of preset phases, a release reward generated by releasing one or more vehicles arriving at the intersection in the at least one first lane for each of the plurality of preset phases; and selecting the next hop phase of the traffic light from the plurality of preset phases of the traffic light according to the release reward of each of the plurality of preset phases.

For example, in the control method provided by an embodiment of the present disclosure, in response to the traffic light being in different phases in two adjacent cycles, a later cycle of the two adjacent cycles is divided into a first stage and a second stage; in the first stage, the traffic light indicates that all vehicles in the plurality of road sections are prohibited from passing through the intersection; in the second stage, the traffic light indicates that one or more vehicles arriving at the intersection in at least some lanes in the plurality of road sections are released; and the expected delay duration comprises a first delay duration in the first stage and a second delay duration in the second stage.

For example, in the control method provided by an embodiment of the present disclosure, determining, according to the expected delay duration respectively generated for each of the plurality of preset phases, the release reward generated by releasing one or more vehicles arriving at the intersection in the at least one first lane for each of the plurality of preset phases, comprises: judging, during a previous cycle of a current cycle of the traffic light, whether the traffic light releases the one or more vehicles arriving at the intersection in the at least one first lane; in response to, during the previous cycle of the current cycle, releasing the one or more vehicles arriving at the intersection in the at least one first lane, and according to the first delay duration and the second delay duration of one or more vehicles in each of the at least one first lane, determining the release reward generated by releasing one or more vehicles arriving at the intersection in the at least one first lane; and in response to, during the previous cycle of the current cycle, not releasing the one or more vehicles arriving at the intersection in the at least one first lane, and according to the second delay duration of one or more vehicles in each of the at least one first lane, determining the release reward generated by releasing one or more vehicles arriving at the intersection in the at least one first lane.

For example, in the control method provided by an embodiment of the present disclosure, in response to, during the previous cycle of the current cycle, releasing the one or more vehicles arriving at the intersection in the at least one first lane, and according to the first delay duration and the second delay duration of one or more vehicles in each of the at least one first lane, determining the release reward generated by releasing one or more vehicles arriving at the intersection in the at least one first lane, comprises: calculating a first sum and a second sum for each first lane, wherein the first sum is a sum of first delay durations of one or more vehicles arriving at the intersection in the first lane, and the second sum is a sum of second delay durations of the one or more vehicles arriving at the intersection in the first lane; converting the sum of first delay durations and the sum of second delay durations into a first release reward and a second release reward according to weights of phases of releasing one or more vehicles in the first lane; and accumulating the first release reward and the second release reward of each of the at least one first lane to obtain the release reward generated by releasing the one or more vehicles arriving at the intersection in the at least one first lane.

For example, in the control method provided by an embodiment of the present disclosure, in response to, during the previous cycle of the current cycle, not releasing the one or more vehicles arriving at the intersection in the at least one first lane, and according to the second delay duration of one or more vehicles in each of the at least one first lane, determining the release reward generated by releasing one or more vehicles arriving at the intersection in the at least one first lane, comprises: accumulating the second release reward of one or more vehicles in each of the at least one first lane to obtain the release reward generated by releasing the one or more vehicles arriving at the intersection in the at least one first lane.

For example, in the control method provided by an embodiment of the present disclosure, selecting the next hop phase of the traffic light from the plurality of preset phases of the traffic light according to a plurality of release rewards comprises: selecting a phase with a largest release reward from the plurality of preset phases of the traffic light as the next hop phase of the traffic light.

For example, in the control method provided by an embodiment of the present disclosure, selecting the next hop phase of the traffic light from the plurality of preset phases of the traffic light according to the plurality of release rewards further comprises: in response to the release reward being maximum for at least two phases, calculating, for each of the at least two phases, an expected delay duration during a next cycle of a current cycle in accordance with a phase of the traffic light during the next cycle of the current cycle being identical to a phase during the current cycle; and selecting a phase with a largest release reward during the next cycle from the plurality of preset phases of the traffic light as the next hop phase of the traffic light.

For example, in the control method provided by an embodiment of the present disclosure, calculating, according to the current driving information of each vehicle, the expected delay duration generated by a vehicle in the at least one first lane if the vehicle is prohibited from passing when arriving at the intersection, comprises: acquiring a first duration required for each vehicle in the at least one first lane to reach the intersection according to the current driving information; judging whether a second lane that each vehicle enters after passing through the intersection is congested; judging whether the first duration is less than a second duration in response to the second lane not being congested, wherein the second duration is a duration of the first stage; in response to the first duration being greater than or equal to the second duration and less than a total duration of one cycle of the traffic light, and the first delay duration when the second lane is not congested being equal to zero, the second delay duration when the second lane is not congested being equal to a difference between the total duration of one cycle of the traffic light and the first duration; and in response to the first duration being less than the second duration, obtaining the first delay duration tri and the second delay duration $t_{v2}$ when the second lane is not congested according to following equations, respectively:

$$t_{v1} = t_{red} - t_r,$$

$$t_{v2} = t_{step} - t_r - t_{v1},$$

wherein $t_{red}$ is the second duration, the $t_r$ is the first duration, and $t_{step}$ is the total duration of one cycle of the traffic light.

For example, in the control method provided by an embodiment of the present disclosure, calculating, according to the current driving information of each vehicle, the expected delay duration generated by a vehicle in the at least one first lane if the vehicle is prohibited from passing when arriving at the intersection, further comprises: acquiring a drivable duration of the each vehicle in the second lane in response to the second lane being congested, wherein the drivable duration is determined according to a drivable distance and a speed of the each vehicle; judging whether the drivable duration is less than the first delay duration $t_{v1}$; in response to the drivable duration being less than the first delay duration $t_{v1}$, obtaining a first delay duration $t'_{v1}$ and a second delay duration $t'_{v2}$ when the second lane is congested according to following equations, respectively:

$$t'_{v1} = \frac{dist_r}{r_n \cdot \text{speed}},$$

$$t'_{v2} = t_{step} - t_{red},$$

wherein $dist_r$ is the drivable distance, and $r_n \cdot$speed is a speed limit of the second lane; and in response to the drivable duration being greater than or equal to the first delay duration $t_{v1}$, and the first delay duration when the second lane is congested being equal to zero, calculating the second delay duration $t'_{v2}$ according to a following equation:

$$t'_{v2} = \frac{dist_r}{r_n \cdot \text{speed}} - t'_{v1}.$$

For example, in the control method provided by an embodiment of the present disclosure, wherein in response to the first duration $t_r$ being less than $2\times t_{step}$ and greater than or equal to $t_{step}$, the expected delay duration $t_{v3}$ during the next cycle of the current cycle is calculated according to a following equation:

$$t_{v3}=2\times t_{step}-t_r.$$

For example, in the control method provided by an embodiment of the present disclosure, the control method further comprises: acquiring statistical data of a plurality of historical cycles; and correcting the first duration according to the statistical data of the plurality of historical cycles.

For example, in the control method provided by an embodiment of the present disclosure, wherein the statistical data comprises at least one first vehicle expected to be released in a statistical lane during a previous historical cycle of two adjacent historical cycles and at least one second vehicle expected to be released in the statistical lane during a later historical cycle of the two adjacent historical cycles, and correcting the first duration according to the statistical data of the plurality of historical cycles comprises: in response to a target vehicle in the at least one first vehicle being also a vehicle in the at least one second vehicle, marking the target vehicle as a miscalculated vehicle; determining an average error according to a speed of the miscalculated vehicle; and correcting the first duration according to the average error.

For example, in the control method provided by an embodiment of the present disclosure, selecting the next hop phase of the traffic light from the plurality of preset phases of the traffic light according to the road condition status information comprises: inputting the road condition status information into a reward calculation model, and calculating, by the reward calculation model, a release reward obtained in a case where each of the plurality of preset phases is served as the next hop phase; and selecting the next hop phase of the traffic light from the plurality of preset phases of the traffic light according to the release reward of the each of the plurality of preset phases.

For example, in the control method provided by an embodiment of the present disclosure, the control method further comprises: acquiring a plurality of sets of training sample data, wherein each set of training sample data comprises a piece of historical road condition status information, the next hop phase of the traffic light, a release reward obtained by the traffic light changing to the next hop phase, and a piece of road condition status information after the traffic light changes to the next hop phase; and inputting the plurality of sets of training sample data to the reward calculation model to train the reward calculation model.

For example, in the control method provided by an embodiment of the present disclosure, the control method further comprises: determining whether there are at least two interrelated congested lanes in the road network; selecting the next hop phase of the traffic light from the plurality of preset phases of the traffic light according to the road condition status information comprises: in response to the presence of the at least two interrelated congested lanes in the road network, determining a first traffic light and a second traffic light respectively corresponding to the at least two interrelated congested lanes; finding a combined manner of a phase of the first traffic light and a phase of the second traffic light; determining a combined release reward for the first traffic light and the second traffic light to respectively release part of lanes in the combined manner; and selecting, according to the combined release reward, a next hop phase of the first traffic light and a next hop phase of the second traffic light, respectively, from the plurality of preset phases of the traffic light.

For example, in the control method provided by an embodiment of the present disclosure, determining whether there are at least two interrelated congested lanes in the road network comprises: acquiring, for each lane in the road network, a ratio of a traffic length in the lane to a length of the lane during a preset time period; determining that the lane is a congested lane in response to the ratio being greater than a preset threshold; in response to the presence of at least two congested lanes in the road network, determining whether traffic at intersections corresponding to the at least two congested lanes interact with each other; and in response to the traffic at intersections corresponding to the at least two congested lanes interacting with each other, determining the at least two congested lanes are interrelated.

For example, in the control method provided by an embodiment of the present disclosure, acquiring the real-time road condition status information of the road network comprises: acquiring a piece of road network information of the road network and historical traffic flow data of the road network; constructing a traffic simulation model according to the road network information and the historical traffic flow data; and outputting the real-time road condition status information of the road network by the traffic simulation model.

At least one embodiment of that present disclosure provides a control apparatus of a traffic light in a road network, wherein the road network comprises a plurality of road sections and an intersection formed by the plurality of road sections, the traffic light is configured to regulate traffic at the intersection, and the control apparatus comprises: an acquisition unit, configured to acquire a piece of real-time road condition status information of the plurality of road sections connected to the intersection in the road network; a selection unit, configured to select a next hop phase of the traffic light from a plurality of preset phases of the traffic light according to the road condition status information; and a control unit, configured to control a phase of the traffic light to be updated to the next hop phase.

At least one embodiment of that present disclosure provides a road network system, which comprises: a road network, comprising a plurality of road sections and an intersection formed by the plurality of road sections; a traffic light, configured to regulate traffic at the intersection; and the control apparatus according to any embodiment of the present disclosure.

For example, in the road network system provided by an embodiment of the present disclosure, the control apparatus further comprises: an adjustment unit, configured to acquire a piece of configuration information of the road network, and adjust the road network according to the configuration information.

For example, in the road network system provided by an embodiment of the present disclosure, the configuration information comprises a piece of position information of the intersection in the road network and/or a total number of the plurality of preset phases of the traffic light.

For example, in the road network system provided by an embodiment of the present disclosure, the adjustment unit is further configured to acquire a piece of control information of tidal lanes in the plurality of road sections, and regulate a driving direction of vehicles in the tidal lanes according to the control information.

At least one embodiment of that present disclosure provides an electronic device, which comprises: a processor; a memory, comprising one or more computer program instructions; the one or more computer program instructions are stored in the memory, and are capable of being executed by the processor to implement the control method of the traffic light in the road network according to any embodiment of the present disclosure.

At least one embodiment of that present disclosure provides a computer-readable storage medium, storing one or more computer-readable instructions non-transitorily, wherein the one or more computer-readable instructions are capable of being executed by a processor to implement the control method of the traffic light in the road network according to any embodiment of the present disclosure.

BRIEF DESCRIPTION OF DRAWINGS

In order to clearly illustrate the technical solutions of the embodiments of the present disclosure, the drawings of the embodiments will be briefly described. It is obvious that the described drawings in the following are only related to some embodiments of the present disclosure and thus are not limitative of the present disclosure.

FIG. 9B illustrates a schematic diagram of combined manners of a phase of a first traffic light and a phase of a second traffic light provided by at least one embodiment of the present disclosure;

FIG. 10A schematically illustrates a flowchart of yet another control method of a traffic light provided by at least one embodiment of the present disclosure;

DETAILED DESCRIPTION

Figure 1A:
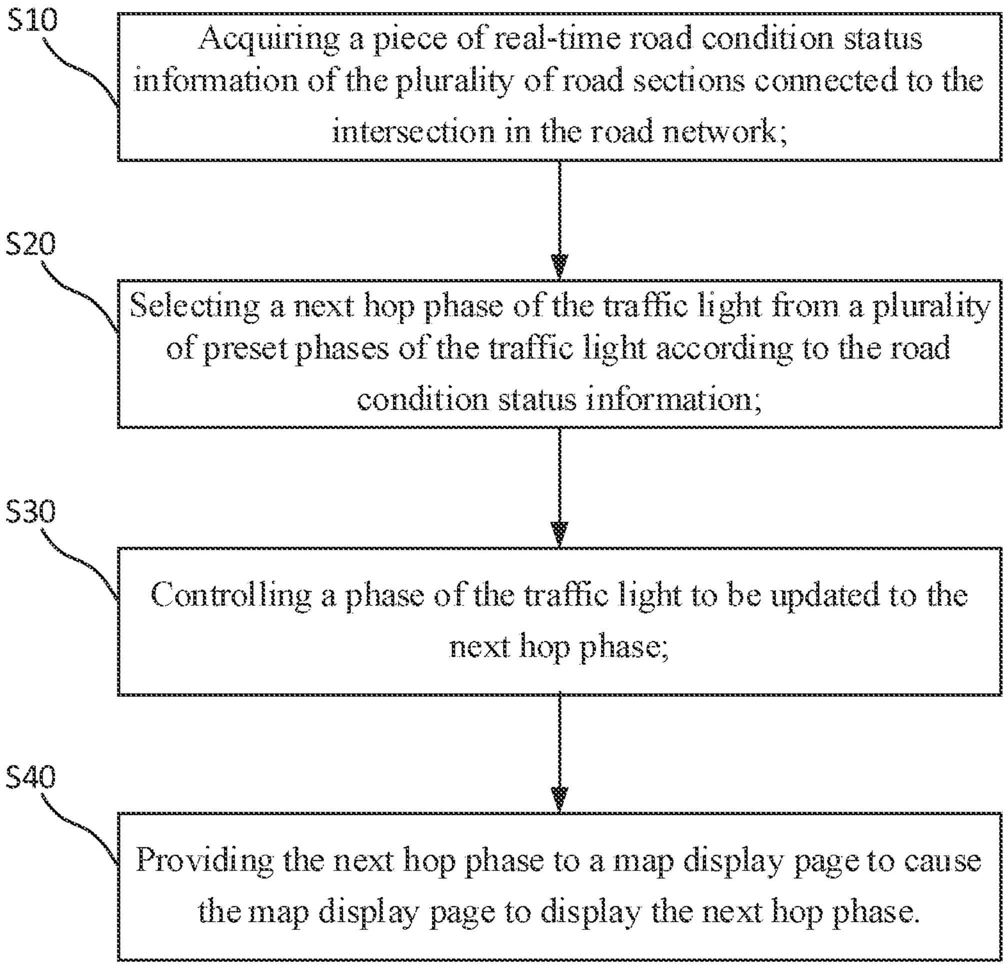
FIG. 1A illustrates a flowchart of a control method of a traffic light in a road network provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right." "left" and the like are only used to indicate relative position relationship, and when the position of the object which is described is changed, the relative position relationship may be changed accordingly.

At present, the common traffic light signal control strategy in the industry is a fixed-cycle timing method, that is, the switching cycle of each traffic light signal and the duration ratio of each signal phase are calculated according to the traffic flow conditions at each intersection and empirical formulas. However, in large cities, due to the complexity of the road network structure and the dynamic changes of traffic flow, the fixed-cycle timing method cannot achieve the optimal effect gradually.

At least one embodiment of the present disclosure provides a control method of a traffic light in a road network, an apparatus, an electronic device and a computer-readable storage medium. A road network includes a plurality of road sections and an intersection formed by the plurality of road sections, the traffic light is configured to regulate traffic at the intersection, and the control method includes: acquiring a piece of real-time road condition status information of the plurality of road sections connected to the intersection in the road network; selecting a next hop phase of the traffic light from a plurality of preset phases of the traffic light according to the road condition status information; and controlling a phase of the traffic light to be updated to the next hop phase. The control method can intelligently and dynamically select phases according to real-time road conditions, thereby reducing the waiting time of vehicles, the queue length of vehicles, etc. as much as possible to achieve the purpose of optimizing traffic. The control apparatus includes an acquisition unit, a selection unit and a control unit. The acquisition unit is configured to acquire a piece of real-time road condition status information of the plurality of road sections connected to the intersection in the road network. The selection unit is configured to select a next hop phase of the traffic light from a plurality of preset phases of the traffic light according to the road condition status information. The control unit is configured to control a phase of the traffic light to be updated to the next hop phase. The control apparatus can intelligently and dynamically select phases according to real-time road conditions, thereby reducing the waiting time of vehicles, the queue length of vehicles, etc. as much as possible to achieve the purpose of optimizing traffic.

FIG. 1A illustrates a flowchart of a control method of a traffic light in a road network provided by at least one embodiment of the present disclosure.

As illustrated in FIG. 1A, the method includes steps S10-S30.

Step S10: acquiring a piece of real-time road condition status information of the plurality of road sections connected to the intersection in the road network.

Step S20: selecting a next hop phase of the traffic light from a plurality of preset phases of the traffic light according to the road condition status information.

Step S30: controlling a phase of the traffic light to be updated to the next hop phase.

Figure 1B:
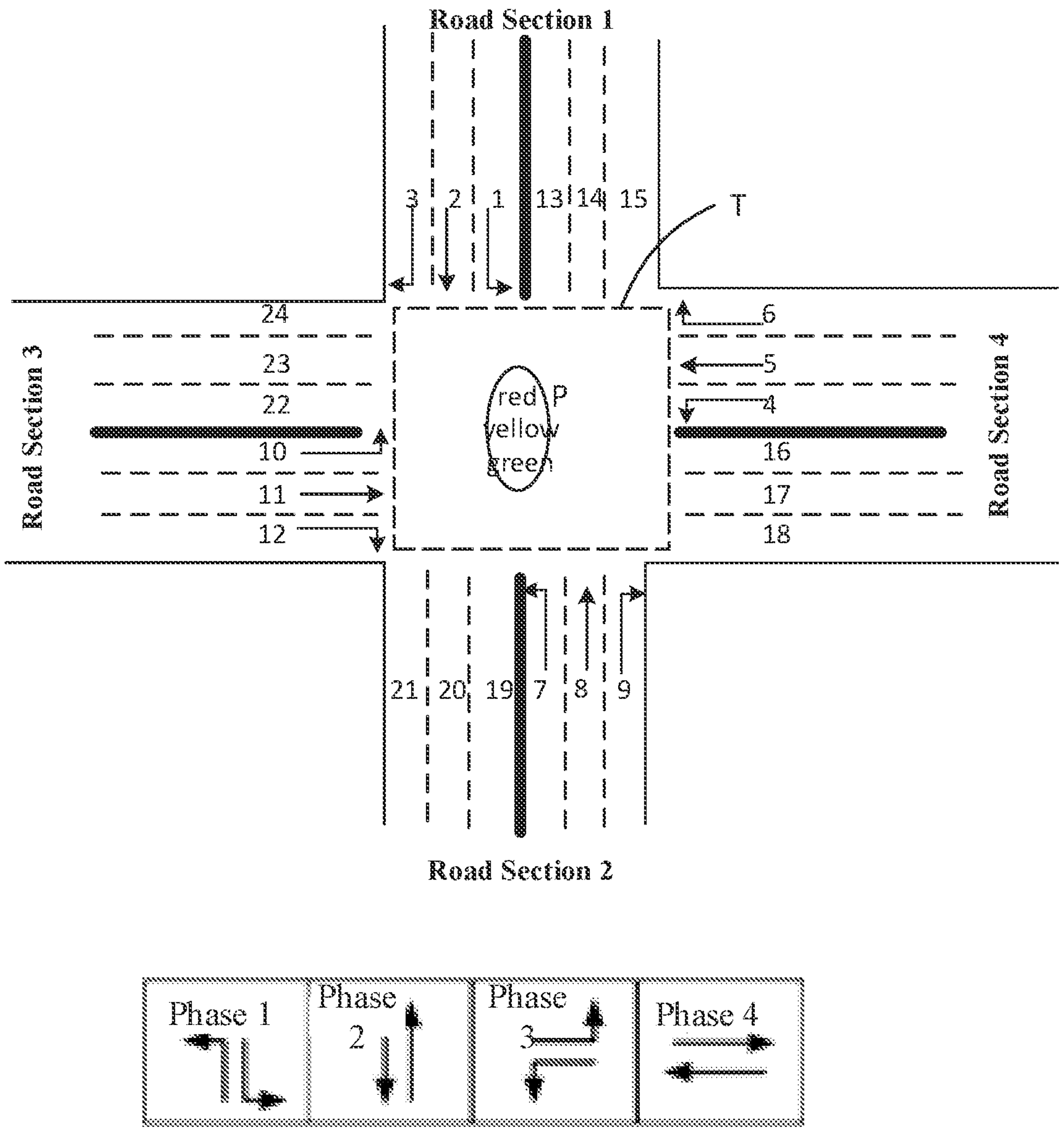
FIG. 1B illustrates a schematic diagram of a road network provided by at least one embodiment of the present disclosure.

FIG. 1B illustrates a schematic diagram of a road network provided by at least one embodiment of the present disclosure. The control method provided by at least one embodiment of the present disclosure will be described below with reference to FIG. 1B and FIG. 1A.

It can be understood that FIG. 1B only illustrates a schematic partial diagram of a partial region of the road network, and is not a complete schematic diagram of the road network.

As illustrated in FIG. 1B, the road network 100 includes a plurality of road sections, namely road section 1, road section 2, road section 3 and road section 4, and an intersection T formed by the plurality of road sections (road section 1~road section 4). For example, a traffic light P is provided at the intersection T, and the traffic light P is configured to regulate the traffic at the intersection T. For example, when a vehicle travels to the end point (that is, the intersection) of the current road section, it is determined whether to suspend driving or continue driving according to an indication of the traffic light.

In some other embodiments of the present disclosure, the road network may include an intersection without a traffic light. At the intersection without a traffic light, the traffic system can, for example, release vehicles by default to improve the compatibility of the traffic system.

As illustrated in FIG. 1B, each of the plurality of road sections includes a plurality of lanes. For example, road section 1 includes lane 1, lane 2, lane 3, lane 13, lane 14 and lane 15. A lane in which the traffic flows into the intersection is called an entry lane, and a lane traveling in a direction away from the intersection is called an exit lane. For example, lane 1, lane 2, and lane 3 in road section 1 are entry lanes, and lane 13, lane 14, and lane 15 in road section 1 are exit lanes. Because the traffic light controls the vehicles in the lanes approaching the intersection, the control method of the present disclosure, for example, analyzes the road condition status information such as the driving speed and traffic length of the vehicles in the entry lanes (e.g., lane 1, lane 2, lane 3, lane 4, lane 5, lane 6, lane 7, lane 8, lane 9, lane 10, lane 11, lane 12 in FIG. 1B) to determine the next hop phase of the traffic light. For example, unless otherwise specified in the following, a "lane" refers to an entry lane.

In the embodiments of the present disclosure, a phase of a traffic light refers to, for example, a combination of release signals, and a release signal indicates a lane to be released. For example, the traffic light includes a red signal, a yellow signal and a green signal, the green signal is a release signal, the red signal is a prohibition signal, and the yellow signal is a waiting signal.

As illustrated in FIG. 1B, for example, the traffic light includes four phases, which are phase 1, phase 2, phase 3 and phase 4, respectively Each phase releases the traffic of two lanes. For example, phase 1 releases traffic in lane 1 and lane 7, phase 2 releases traffic in lane 2 and lane 8, phase 3 releases traffic in lane 10 and lane 4, and phase 4 releases traffic in lane 11 and lane 5.

In some other embodiments of the present disclosure, the traffic light may include 8 phases. The 8 phases may, for example, on the basis of the 4 phases illustrated in FIG. 1B, further include a phase of releasing traffic in lane 2 and lane 1, a phase of releasing traffic in lane 5 and lane 4, a phase of releasing traffic in lane 7 and lane 8, and a phase of releasing traffic in lane 10 and lane 11.

For the step S10, in some embodiments of the present disclosure, the road condition status information includes, for example, road network data, traffic flow data and traffic light status information. The road network data include, for example, road data (for example, road section ID, road section start point, intersection ID where the end point is located, road section length, road section speed limit, total number of lanes, corresponding reverse road section ID, etc.), intersection data (for example, intersection ID, intersection coordinates, whether the traffic light is installed, etc.) and traffic light data (for example, intersection ID where the traffic light is located, road section ID to which the traffic light is connected, etc.). The traffic flow data includes information such as the road section ID and lane ID where each vehicle is currently located, the distance from the start point of the road section to each vehicle, the current speed of each vehicle, etc. The traffic flow data may further include data such as traffic density, occupancy rate, average vehicle speed, and a total number of arriving/departing vehicles within a specified time interval of a lane. The traffic flow data may further include data such as a total number of vehicles passing through within a specified time interval, flow rate, occupancy rate, congestion and delay, etc. The traffic light status information includes, for example, the current phase of the traffic light. In some embodiments of the present disclosure, the total number of lanes in the actual road network may be single (for example, straight-going vehicles, left-turning vehicles, and right-turning vehicles all travel in a single lane). In the case of a single lane, the road network system can divide the single lane into a plurality of virtual lanes, and the driving directions of the vehicles in the plurality of virtual lanes are different. For example, a single lane is divided into a first virtual lane, a second virtual lane and a third virtual lane, the first virtual lane is a left-turn lane, the second virtual lane is a straight lane, the third virtual lane is a right-turn lane, and so on.

In some embodiments of the present disclosure, the road network data may be acquired in advance, and the traffic flow data and traffic light status information may be acquired in real time. For example, the real-time position information of a vehicle is collected through the GPS positioning system mounted on the vehicle, and the data accuracy of the real-time position information obtained through the GPS positioning system is high. For another example, the camera deployed on the road network captures pictures of road conditions, and then the vehicle within the captured view is located by the image recognition technology, so as to deduce the real-time location information of the vehicle. The data sources in this embodiment are relatively concentrated, and the collected information is more comprehensive.

In some other embodiments of the present disclosure, the step S10 includes: acquiring a piece of road network information of the road network and historical traffic flow data of the road network; constructing a traffic simulation model according to the road network information and the historical traffic flow data; and outputting the real-time road condition status information of the road network by the traffic simulation model.

For example, the traffic simulation model is built using SUMO (Simulation of Urban Mobility), and SUMO is an open-source, microcosmic, multi-modal traffic simulation software for simulating the movement of a specified traffic demand consisting of a single vehicle in a specified road network. SUMO can introduce a variety of road network formats (for example, VISUM, Vissim, Shapefile, OSM, RoboCup, MATsim, OpenDRIVE, XML, etc.), and can embed traffic light control algorithms into the simulation process through the TraCI (Traffic Control Interface) interface. The system input of SUMO includes road network files, routing files and detector configuration files. The road network file describes node (i.e., intersection) information, edge (i.e., road section) information, category information (e.g., road type and corresponding number of lanes, speed limit, etc.), and connection information. The routing file describes the route and flow of vehicles, and can assign an individual route to each vehicle, or set the flow rate for the traffic route, and set the frequency or probability of departure. In actual scenarios, for example, based on the traffic flow data collected by traffic detectors at the intersection every 5 minutes, the path generation tool dfrouter that comes with SUMO is used to infer the route and number of vehicles in the road network. The input of dfrouter includes road network files, traffic detector deployment files, and traffic data files, and the output of dfrouter includes vehicle route files and vehicle information description files. These two files can be combined into a routing file, or they can be used separately as an input file for the traffic simulation model. The detector configuration file describes the lane and location information of the traffic detector deployment, which is used to collect the traffic information of the specified intersection during the simulation process, and can also be combined with the actual collected traffic information to generate the traffic flow data of the corresponding time period.

The system output of SUMO includes: traffic density, occupancy rate, average vehicle speed, a total number of arriving/departing vehicles, etc. within a specified time interval of any lane; the status and switching data of any traffic light; the number of passing vehicles, traffic flow, occupancy rate, congestion and delay, etc. within a specified time interval of any virtual detector, and the position, coordinates, heading and speed of each vehicle in any lane at any time. The real-time data required by the algorithm can be called through the interface function of TraCI.

For the step S20, for example, the road network includes a plurality of traffic lights, and each traffic light has 4 or 8 phases, then each traffic light can select a phase from 4 or 8 phases as the next hop phase according to the real-time road condition status information.

For the step S30, for example, the phase of the traffic light is controlled to be updated from the current phase to the next hop phase, and the next hop phase is maintained for a certain time period to release some lanes in the road network. The certain time period may be, for example, 40 seconds, 60 seconds, 90 seconds, etc. For example, as illustrated in FIG. 1B, the current phase of the traffic light is phase 1, if the next hop phase is phase 2, then in the step S30, the traffic light is updated from phase 1 to phase 2 to release traffic in lane 2 and lane 8.

In the embodiments of the present disclosure, the plurality of preset phases are used as a plurality of candidate estimated phases, and the selected influencing factors of each candidate estimated phase are comprehensively considered, so that the traffic light can select the optimal next hop phase according to these selected influencing factors, thereby maximizing the traffic volume of vehicles in a constant time. The selected influencing factors may include, for example, the prefetch delay duration caused by the prohibition of vehicles, the release rewards obtained by the vehicle release, etc., and these selected influencing factors can be obtained according to the road condition status information.

As illustrated in FIG. 1A, the control method may further include step S40.

Step S40: providing the next hop phase to a map display page to cause the map display page to display the next hop phase.

For example, the next hop phase is sent to a map display application, so that the map display application displays the next hop phase of the traffic light on the map display page.

For example, a target intersection that a vehicle will pass through is determined according to the road section and driving direction of the vehicle, and the next hop phase of the traffic light at the target intersection is displayed in the map display page provided by the map display application in the vehicle.

The present embodiment can facilitate the user in the vehicle to acquire the phase of the traffic light in time, so that the user can plan the path in advance and improve the user experience.

Figure 1C:
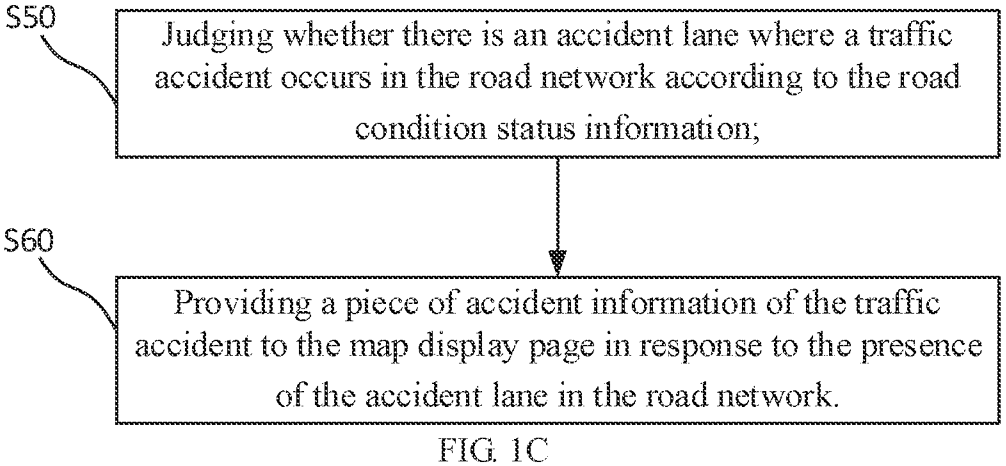
FIG. 1C illustrates a flowchart of another control method provided by at least one embodiment of the present disclosure.

FIG. 1C illustrates a flowchart of another control method provided by at least one embodiment of the present disclosure.

As illustrated in FIG. 1C, the control method may include steps S50 and S60 in addition to steps S10 to S40 illustrated in FIG. 1A.

Step S50: judging whether there is an accident lane where a traffic accident occurs in the road network according to the road condition status information.

Step S60: providing a piece of accident information of the traffic accident to the map display page in response to the presence of the accident lane in the road network.

In some embodiments of the present disclosure, the accident information includes at least one selected from a group consisting of: an expected duration to pass through the accident lane, an expected duration for the traffic accident to be resolved, a piece of lane information of the accident lane, and a phase of a traffic light of an intersection connected to the accident lane.

The control method can timely provide the accident information to the map display page, so as to plan a driving route according to the accident information, thereby saving driving time and improving user experience.

For step S50, for example, it can be determined whether there is an accident lane occurs in the road network according to the driving speed of the vehicle, or according to the information provided and reported by the user.

For step S60, for example, the map display page displays the accident information in the accident road section in response to acquiring the accident information.

In the embodiment illustrated in FIG. 1C, the step S20 includes: acquiring a processing strategy for the traffic accident in response to the presence of the accident lane in the road network; and selecting the next hop phase of the traffic light from the plurality of preset phases of the traffic light according to the processing strategy.

For example, the processing strategy is to select a phase prohibited from driving into the accident lane from the plurality of preset phases of the traffic light as the next hop phase.

For another example, the processing strategy may also include reducing the duration length of the phase that allows vehicles to drive into the accident lane in the plurality of preset phases of the traffic light, and increasing the duration length of the phase that prohibits vehicles from driving into the accident lane.

In some embodiments of the present disclosure, the road condition status information includes a piece of current driving information of each vehicle in the plurality of road sections. The current driving information may include, for example, the current location of the vehicle, the current driving speed of the vehicle, etc.

Figure 2A:
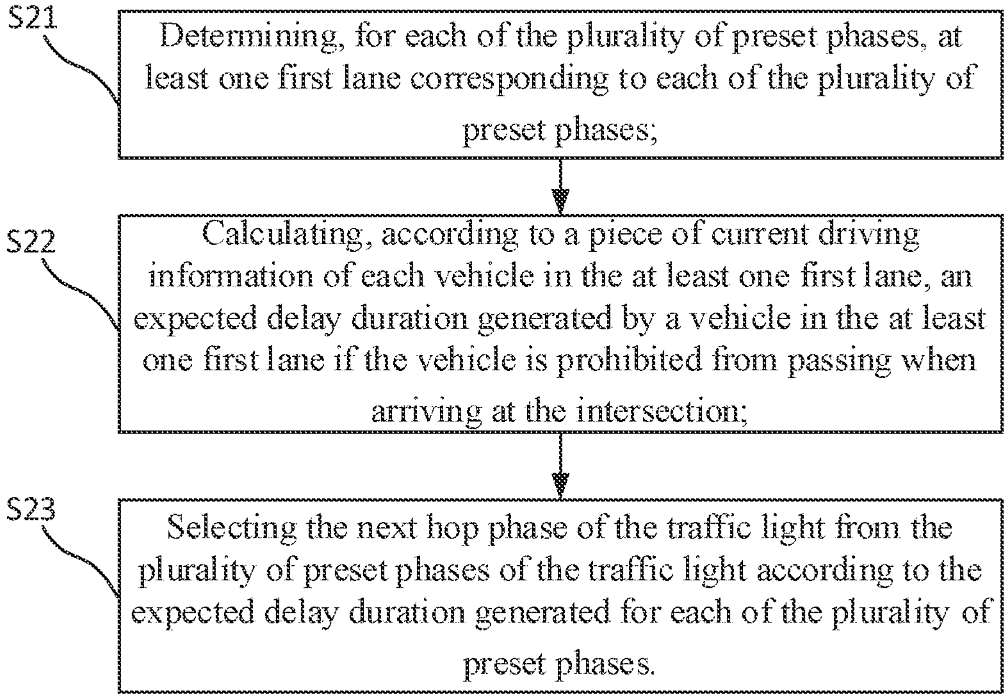
FIG. 2A illustrates a method flowchart of step S20 in FIG. 1A provided by at least one embodiment of the present disclosure.

FIG. 2A illustrates a method flowchart of step S20 in FIG. 1A provided by at least one embodiment of the present disclosure.

As illustrated in FIG. 2A, the step S20 includes steps S21 to S23.

Step S21: determining, for each of the plurality of preset phases, at least one first lane corresponding to each of the plurality of preset phases; the at least one first lane corresponding to each of the plurality of preset phases is a lane of one or more vehicles released to arrive at the intersection for each of the plurality of preset phases;

Step S22: calculating, according to a piece of current driving information of each vehicle in the at least one first lane, an expected delay duration generated by a vehicle in the at least one first lane if the vehicle is prohibited from passing when arriving at the intersection;

Step S23: selecting the next hop phase of the traffic light from the plurality of preset phases of the traffic light according to the expected delay duration generated for each of the plurality of preset phases.

In this embodiment, the next hop phase is determined according to the expected delay duration, which can reduce the waiting time of the vehicle.

For the step S21, for example, in the scenario illustrated in FIG. 1B, phase 1 releases vehicles arriving at the intersection in lane 7 and lane 1, so that phase 1 corresponds to lane 7 and lane 1. Phase 2 releases lane 2 and lane 8, so that phase 2 corresponds to lane 2 and lane 8.

For the step S22, for example, for phase 1, according to the current driving information of each vehicle in lane 7 and lane 1, the expected delay duration generated by each vehicle in lane 7 and lane 1 if the vehicle is prohibited from passing by the traffic light when arriving at the intersection is calculated.

In some embodiments of the present disclosure, in response to the traffic light being in different phases in two adjacent cycles, a later cycle of the two adjacent cycles is divided into a first stage and a second stage; in the first stage, the traffic light indicates that all vehicles in the plurality of road sections are prohibited from passing through the intersection; and in the second stage, the traffic light indicates that one or more vehicles arriving at the intersection in at least some lanes in the plurality of road sections are released. For example, in the first stage, the plurality of preset phase signals of the traffic light are all red lights, that is, the traffic light prohibits vehicles in all lanes from passing. In the second stage, the traffic light maintains the selected next hop phase, so as to release the vehicles arriving at the intersection in at least some lanes of the plurality of road sections. For example, if the next hop phase is phase 2 in FIG. 1B, then in the second stage, the traffic light maintains phase 2 in FIG. 1B to release the vehicles in lane 2 and lane 8. In response to the phase of the traffic light being the same in two adjacent cycles, the later cycle may not have a stage in which the phase signals of the traffic light are all red lights, that is, the later cycle may not have the first stage.

In this embodiment, the expected delay duration includes a first delay duration in the first stage and a second delay duration in the second stage. For example, the first delay duration is the time consumption caused by at least one vehicle in a certain lane being prohibited from passing in the first stage, and the second delay duration is the time consumption caused by at least one vehicle in a certain lane being prohibited from passing in the second stage. Because the traffic light in the second stage releases vehicles arriving at the intersection in some lanes and prohibits vehicles arriving at the intersection in the other lanes, the vehicles in the other lanes have time consumption due to being prohibited from passing.

For the step S23, in some embodiments of the present disclosure, for example, the larger the prefetch delay duration, the greater the release reward obtained for releasing at least one first lane, and the phase with the larger expected delay duration is selected as the next hop phase. For example, the phase of the previous cycle of the current cycle of the traffic light is phase 1 illustrated in FIG. 1B, and the traffic light respectively calculates the expected delay duration of phase 1, phase 2, phase 3 and phase 4. If the expected delay duration resulting from one or more vehicle prohibitions in lane 2 and lane 8 corresponding to phase 2 is greater than the expected delay duration resulting from one or more vehicle prohibitions in lane 7 and lane 1 corresponding to phase 1, greater than the expected delay duration resulting from one or more vehicle prohibitions in lane 4 and lane 10 corresponding to phase 3, and greater than the expected delay duration resulting from one or more vehicle prohibitions in lane 5 and lane 11 corresponding to phase 4, then the next hop phase may be phase 2 in order to release lane 2 and lane 8 to get the maximum release reward.

Figure 2B:
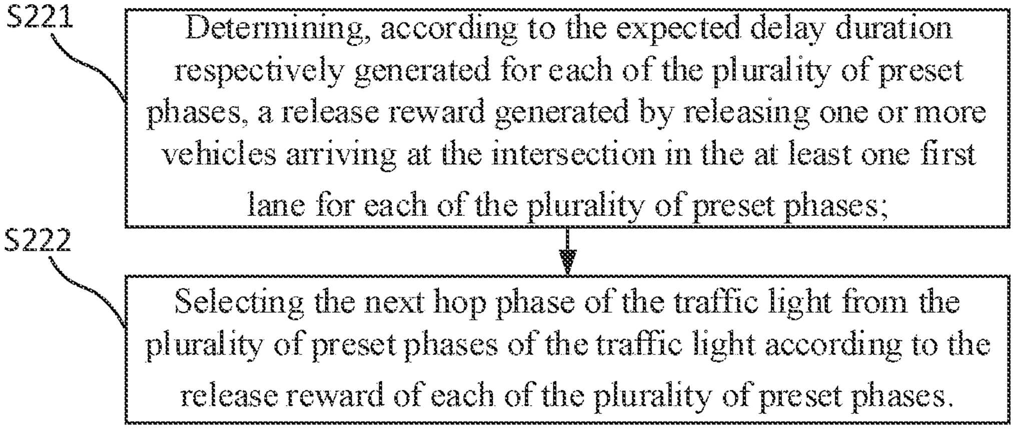
FIG. 2B illustrates a method flowchart of step S22 in FIG. 2A provided by at least one embodiment of the present disclosure.

FIG. 2B illustrates a method flowchart of step S22 in FIG. 2A provided by at least one embodiment of the present disclosure.

As illustrated in FIG. 2B, step S22 includes step S221 and step S222.

Step S221: determining, according to the expected delay duration respectively generated for each of the plurality of preset phases, a release reward generated by releasing one or more vehicles arriving at the intersection in the at least one first lane for each of the plurality of preset phases.

Step S222: selecting the next hop phase of the traffic light from the plurality of preset phases of the traffic light according to the release reward of each of the plurality of preset phases.

Figure 3A:
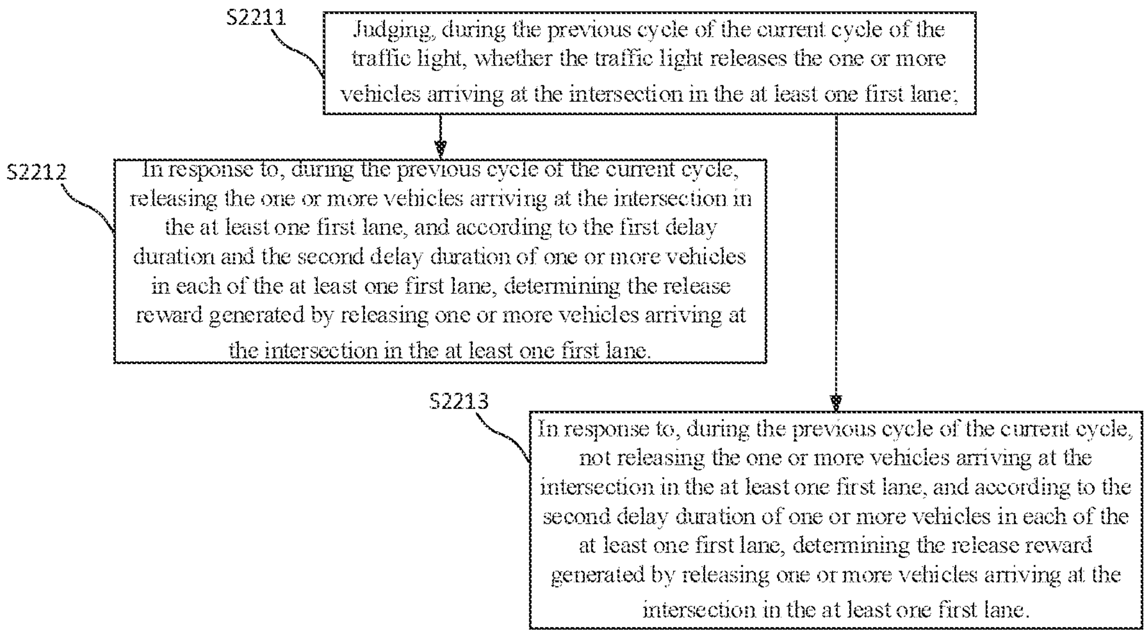
FIG. 3A illustrates a method flowchart of step S221 in FIG. 2B provided by at least one embodiment of the present disclosure.

FIG. 3A illustrates a method flowchart of the step S221 in FIG. 2B provided by at least one embodiment of the present disclosure.

As illustrated in FIG. 3A, the step S221 includes steps S2211 to S2213.

Step S2211: judging, during the previous cycle of the current cycle of the traffic light, whether the traffic light releases the one or more vehicles arriving at the intersection in the at least one first lane.

Step S2212: in response to, during the previous cycle of the current cycle, releasing the one or more vehicles arriving at the intersection in the at least one first lane, and according to the first delay duration and the second delay duration of one or more vehicles in each of the at least one first lane, determining the release reward generated by releasing one or more vehicles arriving at the intersection in the at least one first lane.

Step S2213: in response to, during the previous cycle of the current cycle, not releasing the one or more vehicles arriving at the intersection in the at least one first lane, and according to the second delay duration of one or more vehicles in each of the at least one first lane, determining the release reward generated by releasing one or more vehicles arriving at the intersection in the at least one first lane.

For the step S2211, in the present disclosure, the current cycle refers to the cycle in which the next hop phase of the traffic light selected in the step S20 in FIG. 1A is located.

Figure 3B:
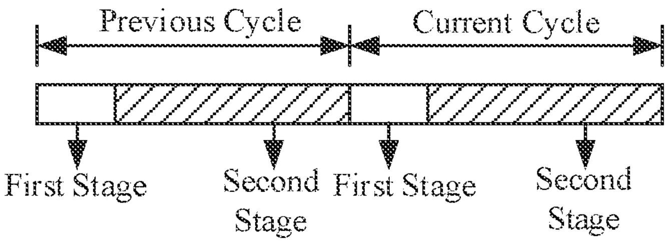
FIG. 3B illustrates a schematic diagram of a cycle of a traffic light provided by at least one embodiment of the present disclosure.

FIG. 3B illustrates a schematic diagram of two adjacent cycles of a traffic light provided by at least one embodiment of the present disclosure.

As illustrated in FIG. 3B, each cycle of the traffic light is divided into a first stage and a second stage. The first stage may be an all-red stage (i.e., indicators in all directions of the traffic light are red) to prohibit all vehicles in the plurality of road sections from crossing the intersection.

As illustrated in FIG. 3B, assuming that the phase of the traffic light in the second stage of the current cycle is phase 1 in FIG. 1B, the at least one first lane is lane 7 and lane 1. If the phase of the traffic light in the second stage of the previous cycle of the current cycle is also phase 1, the previous cycle of the current cycle releases vehicles arriving at the intersection in the at least one first lane (i.e., lane 7 and lane 1).

Assuming that the phase of the traffic light in the second stage of the current cycle is phase 1 in FIG. 1B, the at least one first lane is lane 7 and lane 1. If the phase of the traffic light in the second stage of the previous cycle of the current cycle is phase 2, the previous cycle of the current cycle does not release vehicles arriving at the intersection in the at least one first lane (i.e., lane 7 and lane 1)

Figure 4:
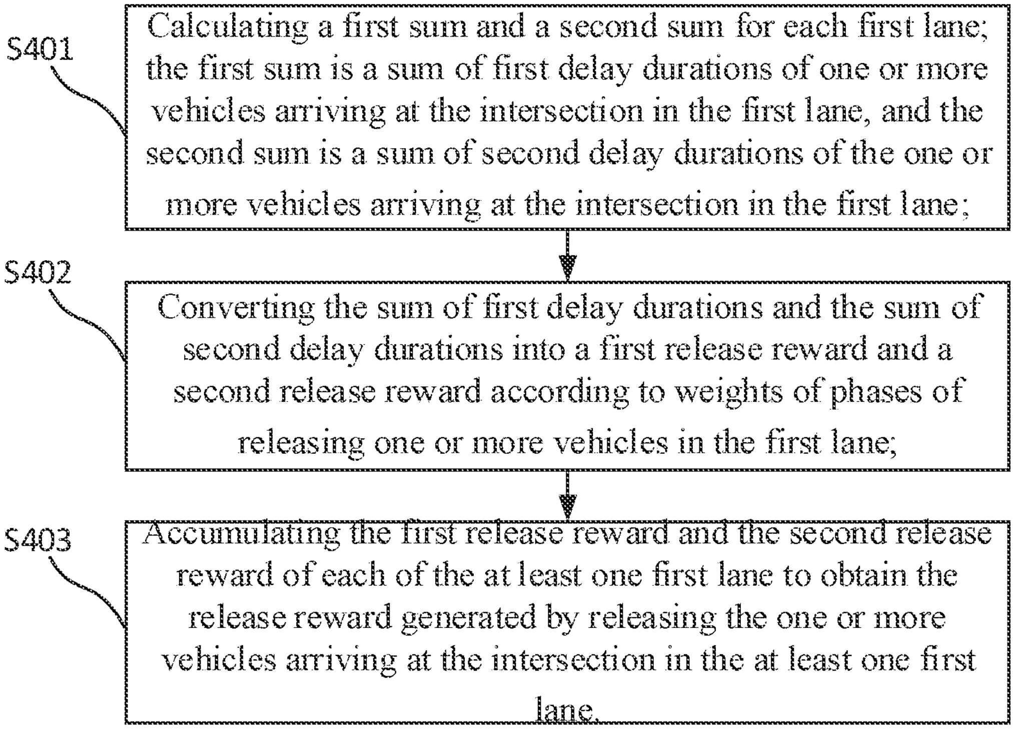
FIG. 4 illustrates a method flowchart of step S2212 in FIG. 3A provided by at least one embodiment of the present disclosure, FIG. 5 schematically illustrates a method flowchart of step S22 in FIG. 2A provided by at least one embodiment of the present disclosure.

For the step S2212, in response to lane 1 and lane 7 being released in the previous cycle of the current cycle, the release reward generated by releasing one or more vehicles arriving at the intersection in lane 1 and lane 7 is determined according to the first delay duration and the second delay duration of each vehicle in lane 1 and lane 7. FIG. 4 below illustrates a method flowchart of step S2212 provided by at least one embodiment of the present disclosure. Please refer to the description in 4 below, and details are not repeated here.

For the step S2213, in response to lane 1 and lane 7 being not released in the previous cycle of the current cycle, the release reward generated by releasing one or more vehicles arriving at the intersection in lane 1 and lane 7 is determined according to the second delay duration of one or more vehicles arriving at the intersection in lane 1 and lane 7.

In some embodiments of the present disclosure, only a phase that is the same as the previous cycle of the current cycle can release vehicles in at least one lane during the entire current cycle, that is, if the phase of the current cycle is the same as the phase of the previous cycle, there may be no first stage but only a second stage in the current cycle. Therefore, for the phase that is the same as the phase of the previous cycle of the current cycle, the release reward is calculated according to the step S2212. For other phases that are not the same as the phase of the previous cycle of the current cycle, vehicles in at least one lane can only be released in the second stage after the first stage. Therefore, for other phases that are not the same as the phase of the previous cycle of the current cycle, the release reward is obtained by calculating according to the step S2213. The embodiment adopts different calculation methods for different phases, which improves the accuracy of the calculation of the release reward.

FIG. 4 illustrates a method flowchart of step S2212 in FIG. 3A provided by at least one embodiment of the present disclosure.

As illustrated in FIG. 4, the step S2212 includes steps S401 to S403.

Step S401: calculating a first sum and a second sum for each first lane. The first sum is a sum of first delay durations of one or more vehicles arriving at the intersection in the first lane, and the second sum is a sum of second delay durations of the one or more vehicles arriving at the intersection in the first lane.

Step S402: converting the sum of first delay durations and the sum of second delay durations into a first release reward and a second release reward according to weights of phases of releasing one or more vehicles in the first lane.

Step S403: accumulating the first release reward and the second release reward of each of the at least one first lane to obtain the release reward generated by releasing the one or more vehicles arriving at the intersection in the at least one first lane.

For the step S401, for example, the at least one first lane includes lane 1 and lane 7, and for lane 1, N vehicles are delayed due to the prohibition of the traffic light, the first sum is a sum y11 of first delay durations generated by the N vehicles in the first stage, and the second sum is a sum y12 of second delay durations generated by the N vehicles in the second stage. For lane 7, M vehicles are delayed due to the prohibition of the traffic light, the first sum is a sum y71 of first delay durations generated by the M vehicles in the first stage, and the second sum is a sum y72 of second delay durations generated by the M vehicles in the second stage. M and N are integers greater than or equal to 0.

For the step S402, the weights of the phases may be determined according to the holding time of the phases. For example, the weight of a phase is proportional to the holding time of the phase.

For example, the first release reward is the product of the weight of the phase and the expected delay duration. For example, the weight of phase 1 is b, then the first release reward of lane 1 is $c1_{v1}$=y11×b, the second release reward of lane 1 is $c1_{v2}$=y12×b, similarly, the first release reward of lane 7 is $c7_{v1}$=y71×b, the second release reward of lane 7 is $c7_{v2}$=y72×b.

For the step S403, the release reward generated by releasing N vehicles arriving at the intersection in lane 1 and lane 7 is $c_p=c1_{v1}+c7_{v1}+c1_{v2}+c7_{v2}$.

For the step S2213, in response to lane 1 and lane 7 not being released in the previous cycle of the current cycle, the release reward generated by releasing the vehicles arriving at the intersection in lane 1 and lane 7 is $c_p=c1_{v2}+c7_{v2}$.

Therefore, assuming that the total number of first lanes corresponding to a certain phase is i, the step S2212 and step S2213 in FIG. 3A are described as the following equations:

$$c_p=\begin{cases} c1_{v1}+\ldots+ci_{v1}+c1_{v2}+\ldots+ci_{v2}, \\ \text{released } inthe \text{ previous cycle of the current cycle} \\ c1_{v2}+\ldots+ci_{v2}, \\ \text{not released } inthe \text{ previous cycle of the current cycle} \end{cases},$$

where $ci_{v1}$ represents the first release reward of the i-th lane, and $ci_{v2}$ represents the second release reward of the i-th lane.

Figure 5:
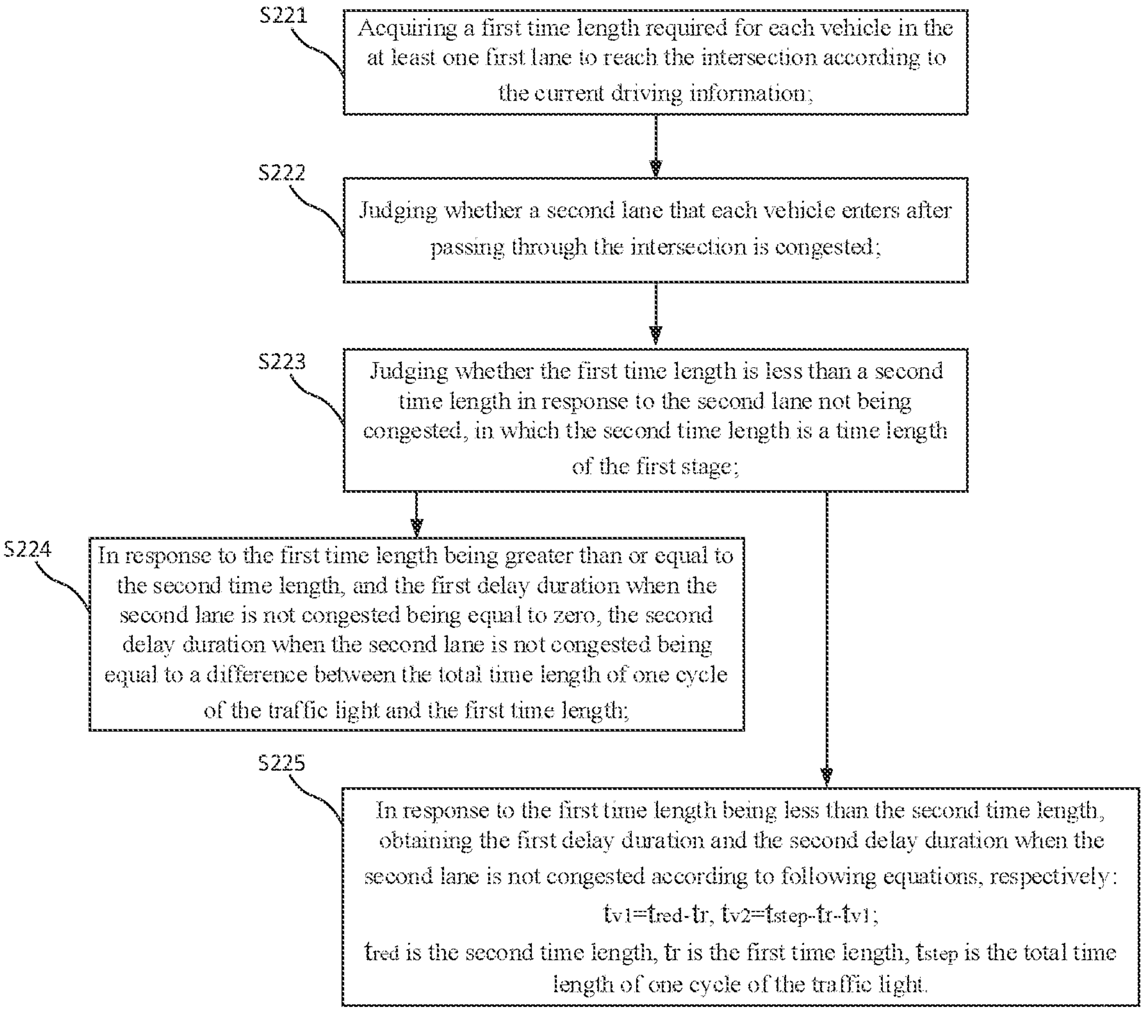

FIG. 5 schematically illustrates a method flowchart of the step S22 in FIG. 2A provided by at least one embodiment of the present disclosure.

As illustrated in FIG. 5, the step S22 includes steps S221 to S225.

Step S221: acquiring a first duration required for each vehicle in the at least one first lane to reach the intersection according to the current driving information.

Step S222: judging whether a second lane that each vehicle enters after passing through the intersection is congested.

Step S223: judging whether the first duration is less than a second duration in response to the second lane not being congested, in which the second duration is a duration of the first stage.

Step S224: in response to the first duration being greater than or equal to the second duration, and the first delay duration when the second lane is not congested being equal to zero, the second delay duration when the second lane is not congested being equal to a difference between the total duration of one cycle of the traffic light and the first duration.

Step S225: in response to the first duration being less than the second duration, obtaining the first delay duration $t_{v1}$ and the second delay duration $t_{v2}$ when the second lane is not congested according to following equations, respectively:

$$t_{v1}=t_{red}-t_r,$$

$$t_{v2}=t_{step}-t_r-t_{v1};$$

where $t_{red}$ is the second duration, the $t_r$ is the first duration, and $t_{step}$ is the total duration of one cycle of the traffic light.

For the step S221, if there are a plurality of vehicles in at least one first lane driving towards the intersection, the first duration required for each of the plurality of vehicles to reach the intersection is obtained, that is, each vehicle corresponds to a first duration.

For example, the first duration may be, during the previous cycle of the current cycle, an estimated value calculated according to the distance from a vehicle in each first lane to the intersection and the speed of the vehicle.

For example, if the instantaneous speed of a vehicle v is equal to the road speed limit, the vehicle v travels at a constant speed at the road speed limit; if the vehicle v accelerates uniformly with an acceleration of a m/s, the vehicle v travels to the v speed limit and then travels at a constant speed. a is greater than 0, for example, a is equal to 2.0, the following takes a=2.0 as an example to introduce the calculation method of the expected time $t_r$ for the vehicle v to reach the end point of the road section, but the present disclosure does not limit the value of a, a may be any value. The first duration $t_r$ required for the vehicle v to reach the intersection (that is, the end point of the road section) can be calculated according to the following equations:

$$t_a=\frac{r\cdot\text{speed}-v\cdot\text{speed}}{2.0},$$

$$d_a=\frac{(r\cdot\text{speed}-v\cdot\text{speed})\times t_a}{2.0},$$

$$t_r=\begin{cases} \dfrac{-v\cdot\text{speed}+\sqrt{v\cdot\text{speed}^2+4\times d_r}}{2.0}, & d_a>d_r \\ \dfrac{r\cdot\text{length}-v\cdot dist-d_a}{r\cdot\text{speed}}+t_a, & d_a\le d_r \end{cases},$$

where v·speed is the current speed of the vehicle, r·speed is the road speed limit, $t_a$ is the time of uniform acceleration, $d_a$ is the distance of uniform acceleration, and $d_a$=r·length−v·dist is the remaining distance for the vehicle v to reach the next intersection.

For the step S222, for example, it may be judged whether the second lane is congested according to the driving speed of the vehicles on the second lane, or whether the second lane is congested according to the reported traffic conditions of the second lane. For example, it is judged whether the second lane is congested according to the reported number of vehicles on the second lane and the average speed of the vehicles.

In some embodiments of the present disclosure, for example, the second lane that the user will enter can be determined according to the destination address input by the user, or it is assumed that the lane of the next road section that the vehicle enters after passing the intersection is the same as the current lane, for example, they are all straight-going lanes, all left-turning lanes or all right-turning lanes, etc.

Determining the second lane according to the destination address input by the user can accurately obtain the second lane that the user is about to enter, thereby more accurately calculating the expected delay duration. Those skilled in the art may also perform the prediction of the second lane according to other methods. For example, the second lane that the vehicle is about to enter is judged according to the historical driving data of the vehicle. In the case where the second lane that the vehicle is about to enter cannot be predicted according to the driving situation of the vehicle, it can be assumed that the lane of the next road section that the vehicle enters after passing the intersection is the same as the current lane, thereby improving the calculation efficiency.

For the step S223, in response to the second lane not being congested, it is judged whether the first duration $t_r$ is less than the second duration $t_{red}$. The second duration refers to the duration of holding all the phase signals of the traffic light in red.

For the step S224, in the case of no congestion in the second lane, in response to $t_{red} \le t_r < t_{step}$ and the first delay duration $t_{v1}$ of each vehicle being equal to zero, the second delay duration $t_{v2}$=the total duration of one cycle of the traffic light $t_{step}-t_r$.

For the step S225, in response to the second lane not being congested and $t_r < t_{red}$, the first delay duration of each vehicle is $t_{v1}=t_{red}-t_r$, and the second delay duration of each vehicle is $t_{v2}=t_{step}-t_r-t_{v1}$.

Figure 6:
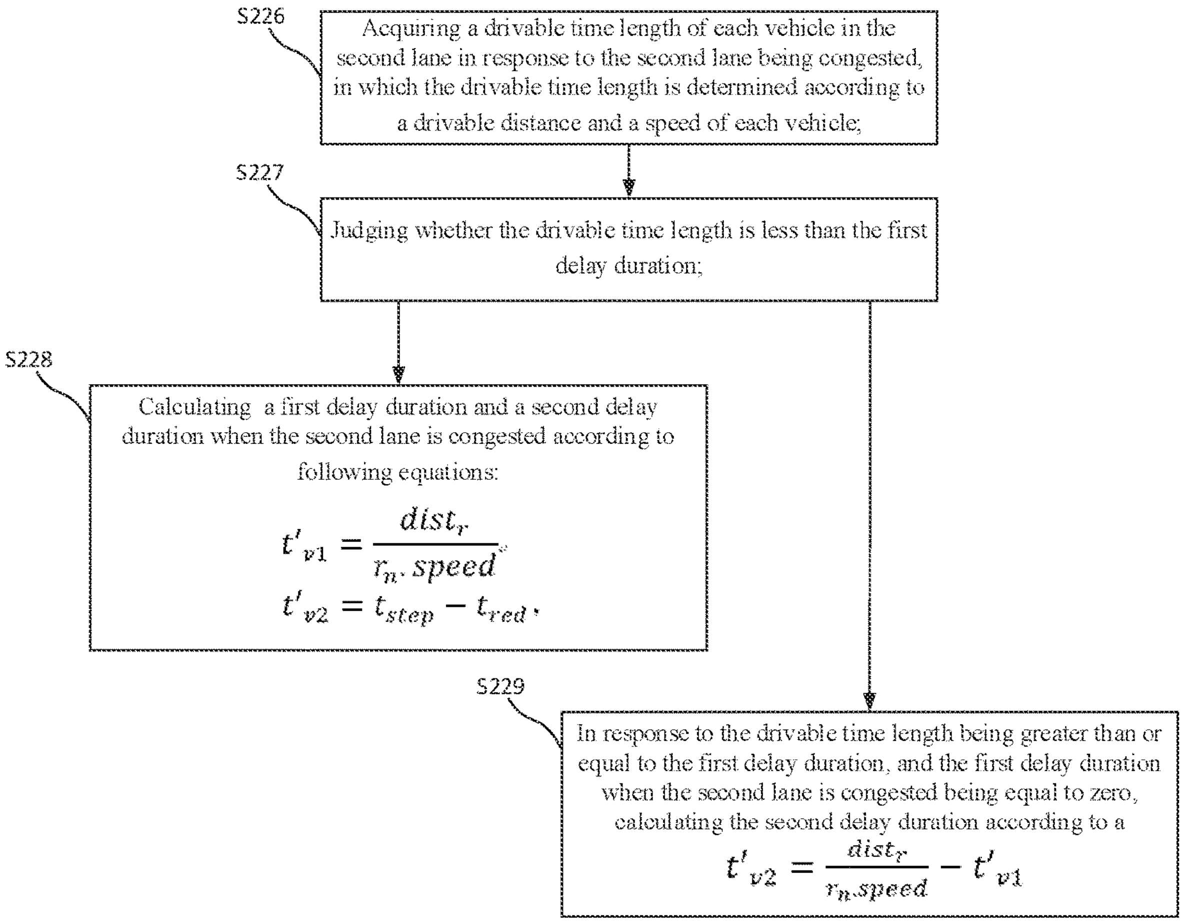
FIG. 6 schematically illustrates another method flowchart of step S22 in FIG. 2A provided by at least one embodiment of the present disclosure.

FIG. 6 schematically illustrates another method flowchart of the step S22 in FIG. 2A provided by at least one embodiment of the present disclosure.

As illustrated in FIG. 6, step S22 further includes steps S226 to S229 in addition to steps S221 to S225.

Step S226: acquiring a drivable duration of each vehicle in the second lane in response to the second lane being congested, in which the drivable duration is determined according to a drivable distance and a speed of each vehicle.

Step S227: judging whether the drivable duration is less than the first delay duration $t_{v1}$.

Step S228: in response to the drivable duration being less than the first delay duration $t_{v1}$, obtaining a first delay duration $t'_{v1}$ and a second delay duration $t'_{v2}$ when the second lane is congested according to following equations, respectively:

$$t'_{v1} = \frac{dist_r}{r_n \cdot \text{speed}},$$

$$t'_{v2} = t_{step} - t_{red},$$

where $dist_r$ is the drivable distance, and $r_n$·speed is the speed limit of the second lane.

Step S229: in response to the drivable duration being greater than or equal to the first delay duration $t_{v1}$, and the first delay duration when the second lane is congested being equal to zero, calculating the second delay duration $t'_{v2}$ according to a following equation:

$$t'_{v2} = \frac{dist_r}{r_n,\ \text{speed}} - t'_{v1}.$$

For the step S226, for example, the drivable duration is equal to the ratio of the drivable distance $dist_r$ to the speed of each vehicle. The speed of each vehicle may be, for example, equal to the speed limit of the second lane.

For the step S227, the drivable duration is compared with the first delay duration $t_{v1}$ (that is, $t_{red}-t_r$) described above in FIG. 5 to judge whether the drivable duration is less than $t_{v1}$.

For the step S228, if the drivable duration $$\frac{dist_r}{r_n.\text{speed}} < t_{v1},$$

the first delay duration $t'_{v1}$ is equal to the drivable duration, that is, $$t'_{v1} = \frac{dist_r}{r_n.\text{speed}},$$

and the second delay duration $$t'_{v2} = t_{step} - t_{red}.$$

For the step S229, if $t_{v1}$<the drivable duration $$\frac{dist_r}{r_n.\text{speed}} < t_{v1} + t_{v2},$$

the first delay duration $t'_{v1}$ is equal to zero, and the second delay duration $$t'_{v2} = \frac{dist_r}{r_n,\ \text{speed}} - t_{v1}.$$

At least one embodiment provided by the present disclosure calculates the first delay duration and the second delay duration respectively for two situations of the second lane being congested and the second lane not being congested, so that the control method provided by the disclosure can be applied to many different scenarios, and the calculation of the prefetch delay duration for a variety of different scenarios is more accurate, so as to make the control of the traffic light more optimized.

In at least one embodiment of the present disclosure, the step S222 in FIG. 2B includes selecting a phase with a largest release reward from the plurality of preset phases of the traffic light as the next hop phase of the traffic light.

In some embodiments of the present disclosure, in response to the release rewards of at least two phases being the largest, for each of the at least two phases, according to the phase of the traffic light in the next cycle of the current cycle being the same as the phase in the current cycle, the expected delay duration in the next cycle of the current cycle is calculated; and the phase with the largest release reward in the next cycle from the plurality of preset phases of the traffic light is select as the next hop phase of the traffic light.

For example, in the scenario illustrated in FIG. 1B, if the next hop phase is that the release rewards of phase 3 and phase 2 are equal and greater than the release rewards of phase 4 and phase 1, then for phase 2, assuming that the phase of the traffic light in the next cycle of the current cycle is also phase 2, the expected delay duration in the next cycle of the current cycle is calculated; and for phase 3, assuming that the phase of the traffic light in the next cycle of the current cycle is also phase 3, the expected delay duration in the next cycle of the current cycle is calculated. If the release reward of that the phases of the current cycle and the next cycle are both phase 2 is greater than the release reward of that the phases of the current cycle and the next cycle are both phase 3, the phase 2 is selected as the next hop phase of the traffic light; and if the release reward of that the phases of the current cycle and the next cycle are both phase 3 is greater than the release reward of that the phases of the current cycle and the next cycle are both phase 2, the phase 3 is selected as the next hop phase of the traffic light.

In some embodiments of the present disclosure, for a traffic light, it may happen that vehicles on all lanes cannot reach the intersection within the next $t_{step}$, and to deal with this situation, the present disclosure calculates the expected delay duration in the next cycle of the current cycle. If $t_{step} \leq t_r < 2 \times t_{step}$, the expected delay duration $t_{v3}$ in the next cycle of the current cycle is calculated according to the following equation:

$$t_{v3} = 2 \times t_{step} - t_r - t_{v1} - t_{v2}.$$

In the above-mentioned equation, because both $t_{v1}$ and $t_{v2}$ are equal to 0, the expected delay duration is $t_{v3} = 2 \times t_{step} - t_r$.

In some embodiments of the present disclosure, the control method further includes: acquiring statistical data of a plurality of historical cycles; and correcting the first duration according to the statistical data of the plurality of historical cycles.

Figure 7:
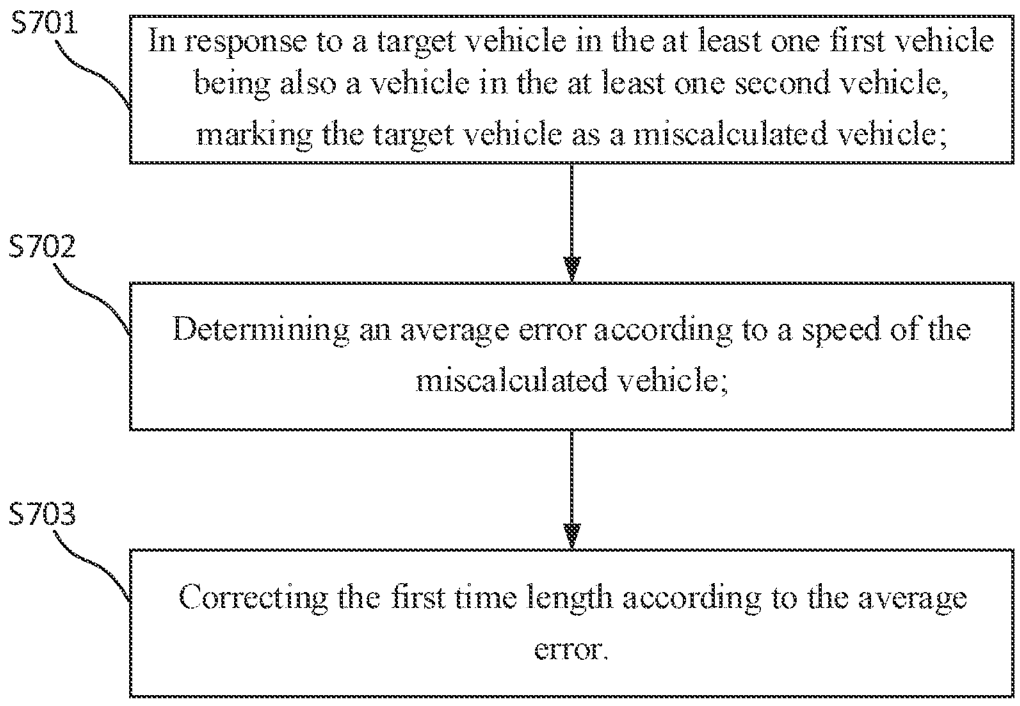
FIG. 7 schematically illustrates a method flowchart for correcting a first duration provided by at least one embodiment of the present disclosure.

FIG. 7 schematically illustrates a method flowchart for correcting the first duration provided by at least one embodiment of the present disclosure.

As illustrated in FIG. 7, the method includes steps S701 to S703. In the embodiment illustrated in FIG. 7, the statistical data includes at least one first vehicle expected to be released in a statistical lane during a previous historical cycle of two adjacent historical cycles and at least one second vehicle expected to be released in the statistical lane during a later historical cycle of the two adjacent historical cycles.

Step S701: in response to a target vehicle in the at least one first vehicle being also a vehicle in the at least one second vehicle, marking the target vehicle as a miscalculated vehicle.

Step S702: determining an average error according to a speed of the miscalculated vehicle.

Step S703: correcting the first duration according to the average error.

This embodiment is capable of correcting the first duration according to the statistical data of two adjacent historical cycles, thereby improving the accuracy of calculating the expected delay duration and release reward, and thus further optimizing the control of the traffic light.

For the step S701, for example, the statistical lane is lane 1 in FIG. 1B, the vehicles including vehicle 1, vehicle 2, vehicle 3 and vehicle 4 in lane 1 during the previous historical cycle are expected to be released, and if vehicle 3 and vehicle 4 are still included in lane 1 during the later historical cycle, then vehicle 3 and vehicle 4 are marked as miscalculated vehicles.

For the step S702, for example, for each statistical lane, the average delay error of the miscalculated vehicles in the statistical lane may be firstly calculated, and then the average error is obtained according to the average delay error of the miscalculated vehicles in each statistical lane.

For example, the average error of the miscalculated vehicles in each statistical lane is calculated according to the following equation:

$$e_l = \frac{\sum_{v \in V_{fl}} (10 - t_r)}{|V_{fl}|},$$

where $e_l$ is the average error of miscalculated vehicles in lane l, $V_{fl}$ is a set of all vehicles marked as miscalculated vehicles in lane l, and $|V_{fl}|$ indicates the total number of vehicles marked as miscalculated vehicles, that is, the total number of elements in the above-mentioned set.

For example, according to the following equation, the average error is obtained according to the average delay error of the miscalculated vehicles in each statistical lane:

$$e_a = \frac{\sum_{l \in L_a} e_l}{|V_a|},$$

where $e_a$ is the average error, and $V_a$ is a set of all vehicles marked as miscalculated vehicles at a traffic light a.

For the step S703, the first duration is corrected according to the average error.

For example, the corrected first duration is $t'_r = t_r \times e_a$.

Figure 8A:
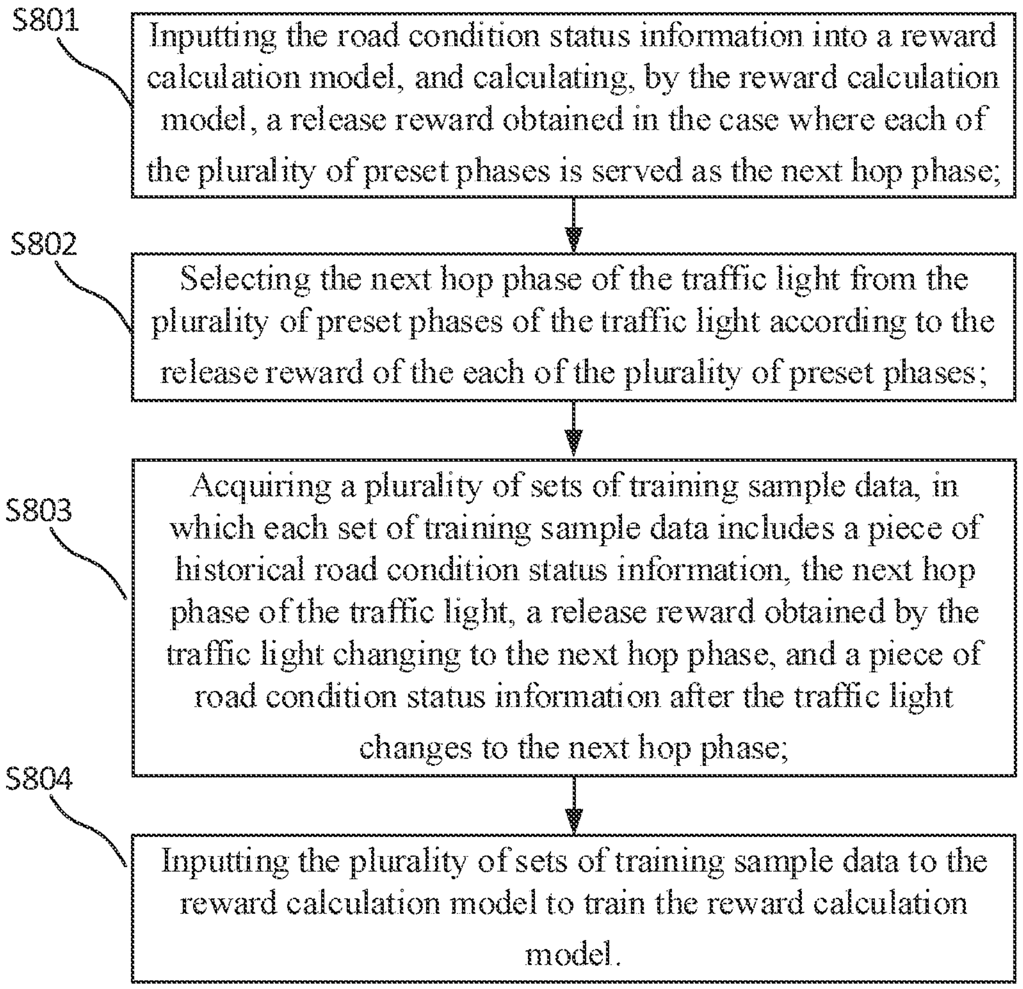
FIG. 8A schematically illustrates a flowchart of another control method of a traffic light provided by at least one embodiment of the present disclosure.

FIG. 8A schematically illustrates a flowchart of another control method of a traffic light provided by at least one embodiment of the present disclosure.

As illustrated in FIG. 8A, the control method includes step S801 and step S802.

Step S801: inputting the road condition status information into a reward calculation model, and calculating, by the reward calculation model, a release reward obtained in the case where each of the plurality of preset phases is served as the next hop phase.

Step S802: selecting the next hop phase of the traffic light from the plurality of preset phases of the traffic light according to the release reward of the each of the plurality of preset phases.

For the step S801, the reward calculation model is, for example, a Q-learning algorithm. In the Q-learning algorithm, Q(s,a) represents the expectation of gaining benefits by taking action a in the state s at a certain moment. The main idea of the algorithm is to construct a Q-table to store the Q-value of taking each action in each state, according to the reward of the environment for action feedback. The Q-value is updated using a time-difference method after each time the agent selects an action and acquires reward feedback:

$$Q(s, a) \leftarrow Q(s, a) + \alpha[r + \gamma \max Q(s', a') - Q(s, a)],$$

where maxQ(s', a') is the maximum expected return selected according to a next state s', $\gamma$ is a discount factor, and r is a reward value. The Q-value approaches the optimum in the process of continuous iteration, and the corresponding optimal strategy is:

$$\pi^* = \arg\max_{a \in A} Q^*(s, a).$$

In the control method of the traffic light provided by the present disclosure, the state s may be the intersection status information, the action a may be the next hop phase, the reward of the environment for the action feedback may be the release reward obtained by updating the traffic light to the next hop phase, and Q'(s,a) represents the optimal reward in a plurality of rewards.

For the step S802, for example, a classifier is used to select the next hop phase of the traffic light from the plurality of preset phases of the traffic light according to the release reward of each phase.

For the step S801 and the step S802, for example, a reinforcement learning model is used to optimize the traffic light control problem. The reinforcement learning model is mainly composed of five elements: environment, agent, state, action, and reward. The reinforcement learning process is defined as a quadruple (S, A, P, R), where S is the state space, A is the action space, and R: S×A→R is the reward function. When the time is t, the agent obtains the state information $S_t \in S$ from the environment, selects a corresponding action $A_t$ according to the algorithm, inputs a new state $S_{t+1} \in S$ into the environment, and receives a reward $R_t$ as the reward feedback. The goal of the reinforcement learning algorithm is to learn an optimal strategy π: S→A that maximizes the long-term reward $R_0^T = \Sigma_{i=0}^T \gamma r(s_i, a_i)$, in which Tis a termination time, r $(s_i, a_i)$ is the reward obtained by performing an action $a_i$ in a state $s_i$, and γ is the discount factor. The optimal strategy π is solved using DQN (Deep Q Network), and DON is a reinforcement learning algorithm that combines Q-learning algorithm and deep learning. In practical scenarios, the construction of Q-table becomes infeasible in the case where the state space is too large. Therefore, DQN adopts a deep learning model to fit the Q-value function, trains network parameters based on historical state-action-reward samples, and is able to directly output the corresponding Q-value according to the input of the state after convergence. A deep learning model is constructed using a single-layer neural network and a softmax classifier.

Therefore, as illustrated in FIG. 8A, the control method further includes steps S803 and S804 in addition to steps S801 and S802.

Step S803: acquiring a plurality of sets of training sample data, in which each set of training sample data includes a piece of historical road condition status information, the next hop phase of the traffic light, a release reward obtained by the traffic light changing to the next hop phase, and a piece of road condition status information after the traffic light changes to the next hop phase.

Step S804: inputting the plurality of sets of training sample data to the reward calculation model to train the reward calculation model.

For the step S803, for example, the historical road condition status information includes, but not limited to, the average waiting time, queue length, and average speed of vehicles in each lane. For example, for any vehicle in the lane, the waiting time of the vehicle starts to be recorded when its speed is less than 0.1 m/s and is zeroed out when its speed is greater than 0.1 m/s.

For example, the release reward refers to a feedback reward function obtained after the phase of the traffic light is changed to the next hop phase (i.e., to perform an action). For example, the release reward is defined as: $r = -\Sigma_L w$, where L is a set of entry lanes controlled by the traffic light, w is the waiting time of a vehicle in the entry lane, and the entry lane is a lane in which the traffic towards the intersection.

For the step S804, during the training process, the entire training system is repeated to deduce a specified number of rounds. In each round, the training process is deduced with a fixed time interval as the step size. For example, if the specified number of rounds is K, K is an integer greater than or equal to 1, the training samples collected every 24 hours are taken as a round, and the fixed time interval is 10 seconds, then an iteration is performed every 10 seconds in each round, and 8640 iterations are performed in each round. In each iteration, the historical road condition status information is first calculated and fed into the DQN model, and after the model outputs the phases of each traffic light in the next step, for example, it is set to take effect in a simulation system of the road network. Next, the simulation system performs the next deduction, calculates the road condition status information in road network environment of a new step, and performs experience playback. The experience playback means that training samples are generated during the simulation process and cached into an experience pool for DQN model training. Because each time an action is performed, the traffic light will move to the next state and receive a reward, a quadruple (s, a, r, s') can be obtained and placed in the experience pool, where s is the historical road condition status information, a is an action taken by the traffic light, r is the reward after taking the action, and s' is the road condition status information of a new step. Due to the correlation between the quadruples generated in each step, if a batch of quadruples are taken sequentially as a training set, it is easy to overfit. Therefore, each time the model is trained, a small number of quadruples are randomly selected from the experience pool as a group for model training. In addition, in order to prevent overfitting, the DQN model after each round of training is not directly used for phase decision making in the next step, but rather the DQN model for decision making is updated at a specified frequency. Finally, the training ends when the simulation system repeats the specified number of rounds of inference, and the resulting DQN model can be used for future decision making.

In some embodiments of the present disclosure, the control method further includes determining whether there are at least two interrelated congested lanes in the road network. In this embodiment, the step S20 in FIG. 1A includes: in response to the presence of the at least two interrelated congested lanes in the road network, determining a first traffic light and a second traffic light respectively corresponding to the at least two interrelated congested lanes; finding a combined manner of a phase of the first traffic light and a phase of the second traffic light; determining a combined release reward for the first traffic light and the second traffic light to respectively release part of lanes in the combined manner; and selecting, according to the combined release reward, a next hop phase of the first traffic light and a next hop phase of the second traffic light, respectively, from the plurality of preset phases of the traffic light.

Figure 9A:
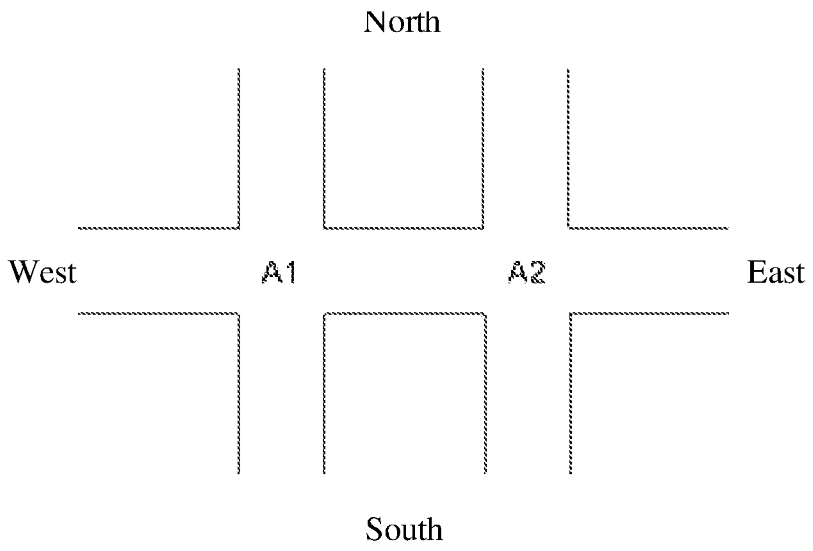
FIG. 9A illustrates a schematic diagram of a control method provided by at least one embodiment of the present disclosure in the case where there are two interrelated congested lanes in the road network.

For example, the accident lane described above in FIG. 1C is an example of a congested lane. In the case where a certain lane is an accident lane, the selection of the next hop phase can be performed according to the embodiment in which there are at least two interrelated congested lanes in the road network in the above-mentioned step S20. FIG. 9A and FIG. 9B below illustrate an implementation of the selection of the next hop phase in the case where there are at least two interrelated congested lanes in the road network in the above-mentioned step S20.

Figure 8B:
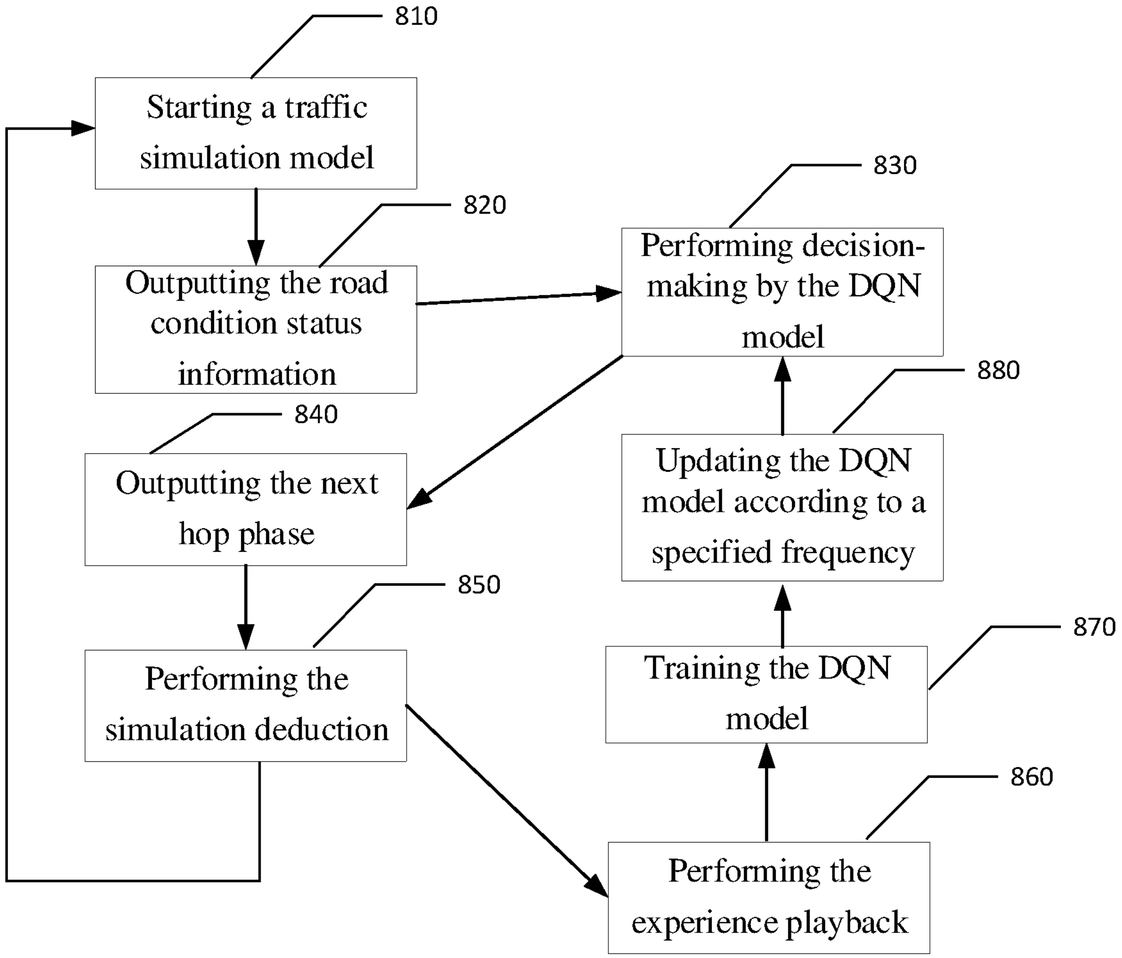
FIG. 8B schematically illustrates a flowchart of yet another control method of a traffic light provided by at least one embodiment of the present disclosure.

FIG. 8B schematically illustrates a flowchart of yet another control method of a traffic light provided by at least one embodiment of the present disclosure.

As illustrated in FIG. 8B, the control method of the traffic light includes steps S810 to S880.

Step S810: starting a traffic simulation model, in which the traffic simulation model may be constructed by using the SUMO system. For example, the road network flow data is inputted into the traffic simulation model.

Step S820: outputting the road condition status information in real time by the traffic simulation model.

Step S830: inputting the road condition status information into a DQN model, and performing decision-making of the next hop phase by the DQN model.

Step S840: outputting the next hop phase of each traffic light for decision-making by the DQN model.

Step S850: performing the simulation deduction to obtain deduced road condition status information by the traffic simulation model. For example, each of a plurality of traffic lights in the traffic simulation model is updated to a corresponding next hop phase, so that the traffic simulation model can perform the simulation deduction to obtain deduced road condition status information.

Step S860: performing the experience playback. For example, the training samples generated by deduction are cached into an experience pool.

Step S870: training the DQN model by using the training samples in the experience pool.

Step S880: updating the DQN model according to a specified frequency.

FIG. 9A illustrates a schematic diagram of a control method provided by at least one embodiment of the present disclosure in the case where there are two interrelated congested lanes in the road network.

FIG. 9B illustrates a schematic diagram of combined manners of a phase of a first traffic light and a phase of a second traffic light provided by at least one embodiment of the present disclosure.

As illustrated in FIG. 9A, it is assumed that the left-turning and straight-going lanes respectively controlled by a traffic light A1 and a traffic light A2 are all marked as congested lanes. Because the traffic light A1 and the traffic light A2 are adjacent to each other, the traffic controlled by the traffic light A1 interacts with the traffic controlled by the traffic light A2, that is, a plurality of lanes controlled by the traffic light A1 and the traffic light A2 are interrelated. The traffic light A1 and the traffic light A2 are examples of the first traffic light and the second traffic light, respectively. Because the left-turning and straight-going traffic lanes controlled by the traffic light A1 and the traffic light A2 respectively are interrelated and are both congested lanes, the traffic light A1 and the traffic light A2 should be considered in conjunction with each other. The combined manners of the phases of the traffic light A1 and the traffic light A2 are illustrated in FIG. 9B.

For example, as illustrated in FIG. 9B, combined manner 1 means that the traffic light A1 and the traffic light A2 both allow straight-going traffic in east-west direction; and combined manner 2 means that the traffic light A1 allows straight-going traffic in east-west direction, and the traffic light A2 allows vehicles traveling in east-west direction to turn left.

As illustrated in FIG. 9B, combined manner 1-combined manner 6 are collaborative evacuation phases (i.e., the lanes released by two traffic lights are connected), and combined manner 7 is an independent evacuation phase (i.e., the lanes released by two traffic lights are not connected) The combined release rewards of the 7 phases in FIG. 9B are calculated according to the release rewards of the traffic light A1 and the traffic light A2 for releasing some lanes in each of the plurality of combined manners. For example, the release reward of the traffic light A1 in the combined manner is summed with the release reward of the traffic light A2 in the combined manner. Finally, the combined manner with the largest combined release reward is obtained.

In some embodiments of the present disclosure, determining whether there are at least two interrelated congested lanes in the road network includes: acquiring, for each lane in the road network, a ratio of a traffic length in the lane to a length of the lane during a preset time period; determining that the lane is a congested lane in response to the ratio being greater than a preset threshold; in response to the presence of at least two congested lanes in the road network, determining whether traffic at intersections corresponding to the at least two congested lanes interact with each other; and in response to the traffic at intersections corresponding to the at least two congested lanes interacting with each other, determining the at least two congested lanes are interrelated.

For example, in the process of traffic simulation, the congestion area is judged according to the lane occupancy rate information output by the SUMO system in real time. The lane occupancy rate is defined as the ratio of the traffic length staying in the lane to the length of the lane within a specified time, and the value range is between 0-1. In the case where the lane occupancy rate exceeds a specified threshold, the lane is defined as congested. According to business requirements, different congestion thresholds can be defined for different levels of lanes. At any given moment, the system finds all congested lanes after outputting all lane occupancy rates in the road network. For example, connected lanes in the road network topology are connected into a congested area. For example, the traffic at the intersection corresponding to the connected lanes in the road network topology affects each other, and the connected lanes are interrelated. If two connected lanes are both congested, the two connected lanes are two interrelated congested lanes.

FIG. 10A schematically illustrates a flowchart of yet another control method of a traffic light provided by at least one embodiment of the present disclosure.

As illustrated in FIG. 10A, the control method of the traffic light includes steps S1001 to S1006.

Step S1001: acquiring traffic flow data of a road network.

Step S1002: inputting the traffic flow data of the road network into a traffic simulation model to obtain real-time road condition status information. The traffic simulation model may be constructed using a SUMO system.

Step S1003: mining the congestion area according to the lane occupancy rate information in the road condition status information output by the traffic simulation model in real time.

Step S1004: for each traffic light, calculating the next hop phase of the traffic light according to the road condition status information.

Step S1005: for a plurality of traffic lights in the congestion area, determining the respective phases of the plurality of traffic lights according to combined release rewards.

Step S1006: updating the phase of each traffic light to the respective next hop phase.

Figure 10B:
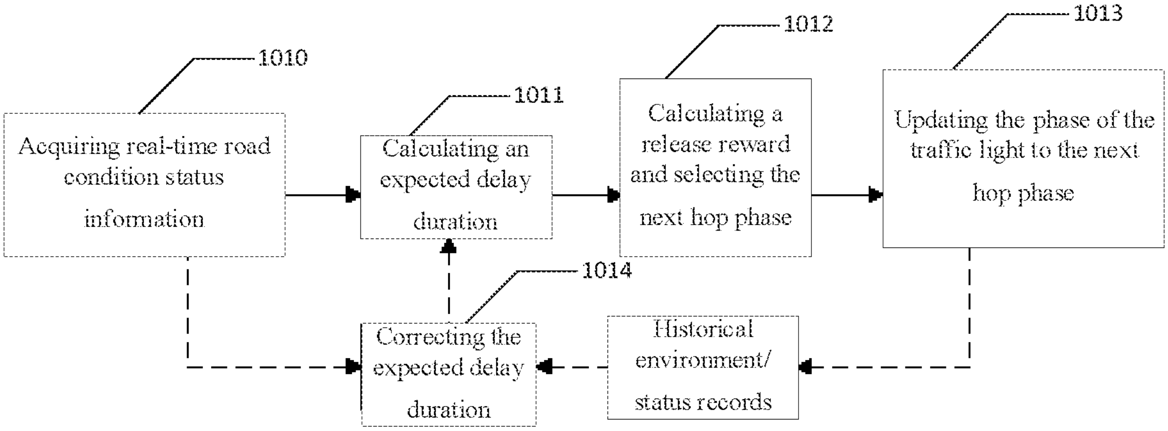
FIG. 10B schematically illustrates a flowchart of yet another control method of a traffic light provided by at least one embodiment of the present disclosure.

FIG. 10B schematically illustrates a flowchart of yet another control method of a traffic light provided by at least one embodiment of the present disclosure.

As illustrated in FIG. 10B, the control method of the traffic light includes steps S1010 to S1014.

Step S1010: acquiring real-time road condition status information.

Step S1011: calculating an expected delay duration according to the real-time road condition status information. For example, the expected delay duration is calculated according to the method described in FIG. 2B.

Step S1012: calculating a release reward for each phase of the traffic light according to the expected delay duration, and selecting the next hop phase according to the release reward. For example, the release reward for each phase is calculated according to the method described in FIG. 3A.

Step S1013: updating the phase of the traffic light to the next hop phase.

Step S1014: correcting the calculation of the expected delay duration by using the road condition status information used each time and the next hop phase after each update as the statistical data of the historical cycle. For example, the statistical data of a plurality of historical cycles is acquired; and the first duration is corrected according to the statistical data of the plurality of historical cycles. For example, the first duration is corrected according to the method described in FIG. 7, and thus the calculation of the expected delay duration is corrected.

The control method corrects the first duration, thereby improving the calculation accuracy, further reducing the waiting time of vehicles, the queue length of vehicles, etc. to achieve the purpose of optimizing traffic.

Figure 11:
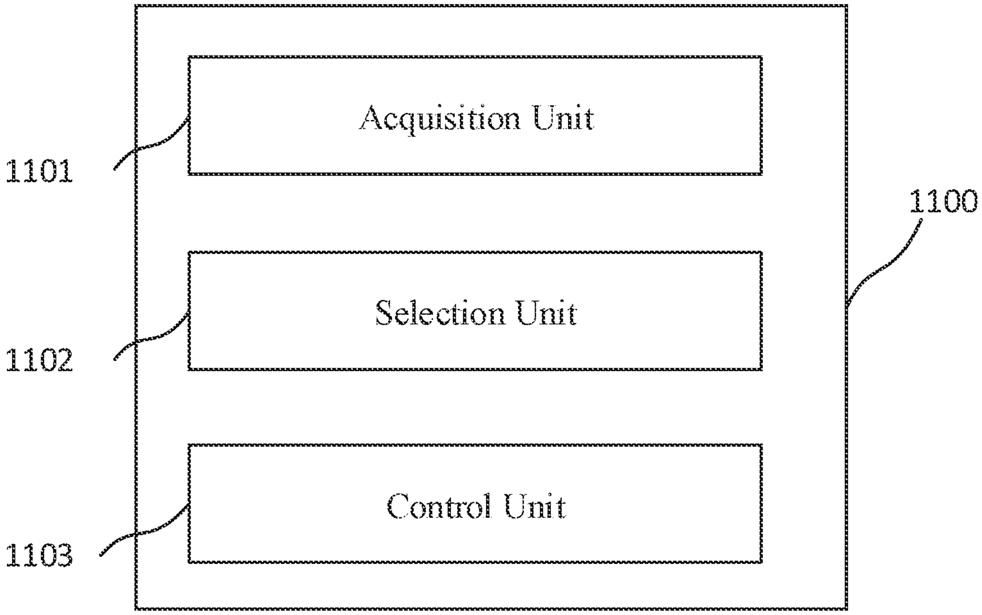
FIG. 11 schematically illustrates a schematic diagram of a control apparatus of a traffic light in a road network provided by at least one embodiment of the present disclosure.

FIG. 11 schematically illustrates a schematic diagram of a control apparatus 1100 of a traffic light in a road network provided by at least one embodiment of the present disclosure.

As illustrated in FIG. 11, the control apparatus 1100 includes an acquisition unit 1101, a selection unit 1102 and a control unit 1103.

The acquisition unit 1101 is configured to acquire the real-time road condition status information of the plurality of road sections connected to the intersection in the road network.

The acquisition unit 1101 may, for example, execute the step S10 described above in FIG. 1A.

The selection unit 1102 is configured to select the next hop phase of the traffic light from a plurality of preset phases of the traffic light according to the road condition status information.

The selection unit 1102 may, for example, execute the step S20 described above in FIG. 1A.

The control unit 1103 is configured to control the phase of the traffic light to be updated to the next hop phase.

The control unit 1103 may, for example, execute the step S30 described above in FIG. 1A.

The control apparatus can intelligently and dynamically select phases according to real-time road conditions, so as to reduce the waiting time of vehicles and the queue length of vehicles as much as possible to achieve the purpose of optimizing traffic.

At least one embodiment of the present disclosure further provides a road network system. The road network system includes a road network, a traffic light and the above-mentioned control apparatus. The road network includes a plurality of road sections and an intersection formed by the plurality of road sections, and the traffic light is configured to regulate traffic at the intersection.

For example, the control apparatus further includes an adjustment unit configured to acquire a piece of configuration information of the road network, and adjust the road network according to the configuration information.

In some embodiments of the present disclosure, the adjustment unit can interact with the user, for example, receive input from the user, selection of icons by the user, and other operations. For example, the display page provided by the road network system is displayed on a user's touch screen, and the adjustment unit can receive the user's circle selection on the touch screen to mark information such as congested lanes and lanes with good road conditions, and the like.

For example, the configuration information includes a piece of position information of the intersection in the road network and/or a total number of the plurality of preset phases of the traffic light. For example, the total number of the preset phases of the traffic light is set to 4, 8, etc., and the user can input the configuration information to configure the total number of the preset phases of the traffic light.

For another example, the configuration information includes the total number of lanes in the road network and the setting of intersections. Users can update the road network by inputting the configuration information.

For example, the adjustment unit is further configured to acquire a piece of control information of tidal lanes in the plurality of road sections, and regulate a driving direction of vehicles in the tidal lanes according to the control information. The tidal lane is, for example, a north-south lane, and the control information may, for example, be travel from south to north or travel from north to south. If the control information is travel from south to north, the vehicles in the tidal lane can only travel from south to north.

In some embodiments of the present disclosure, the control apparatus 1100 further includes a display unit configured to provide the next hop phase to a map display page to cause the map display page to display the next hop phase.

In some embodiments of the present disclosure, the control apparatus 1100 further includes a judgment unit and a providing unit. The judgment unit is configured to judge whether there is an accident lane where a traffic accident occurs in the road network according to the road condition status information. The providing unit is configured to provide a piece of accident information of the traffic accident to the map display page in response to the presence of the accident lane in the road network, and the accident information includes at least one selected from a group consisting of: an expected duration to pass through the accident lane, an expected duration for the traffic accident to be resolved, a piece of lane information of the accident lane, and a phase of a traffic light of an intersection connected to the accident lane.

In some embodiments of the present disclosure, the selection unit 1102 includes a strategy acquisition subunit and a selection subunit. The strategy acquisition subunit is configured to acquire a processing strategy for the traffic accident in response to the presence of the accident lane in the road network. The selection subunit is configured to select the next hop phase of the traffic light from the plurality of preset phases of the traffic light according to the processing strategy.

At least one embodiment of the present disclosure further provides an electronic device, the electronic device includes a processor and a memory, and the memory includes one or more computer program modules. The one or more computer program modules are stored in the memory and configured to be executed by the processor, and the one or more computer program modules include instructions for achieving the above-mentioned control method. The electronic device can intelligently and dynamically select phases according to real-time road conditions, so as to reduce the waiting time of vehicles, the queue length of vehicles, etc. as much as possible to achieve the purpose of optimizing traffic.

Figure 12:
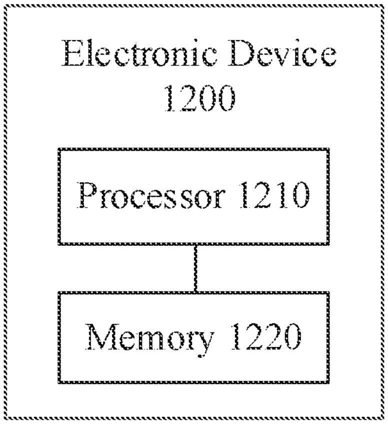
FIG. 12 illustrates a schematic block diagram of an electronic device provided by at least one embodiment of the present disclosure.

FIG. 12 illustrates a schematic block diagram of an electronic device provided by at least one embodiment of the present disclosure. As illustrated in FIG. 12, the electronic device 1200 includes a processor 1210 and a memory 1220. The memory 1220 is configured to store non-transitory computer-readable instructions (e.g., one or more computer program modules). The processor 1210 is configured to execute the non-transitory computer-readable instructions, and when the non-transitory computer-readable instructions are executed by the processor 1210, one or more steps in the control method described above are performed. The memory

1220 and the processor 1210 may be interconnected by a bus system and/or other forms of connection mechanisms (not illustrated).

For example, the processor 1210 is a central processing unit (CPU), a graphics processing unit (GPU), or other forms of processing units having data processing capabilities and/or program execution capabilities. For example, the central processing unit (CPU) may be an ×86 or ARM architecture, and the like. The processor 1210 may be a general-purpose processor or a special-purpose processor, and can control other components in the electronic device 1200 to perform desired functions.

For example, the memory 1220 includes any combination of one or more computer program products, which may include various forms of computer-readable storage media, such as volatile memory and/or non-volatile memory. The volatile memory may include, for example, random access memory (RAM) and/or cache memory, etc. The non-volatile memory may include, for example, read-only memory (ROM), hard disk, erasable programmable read-only memory (EPROM), compact disk read-only memory (CD-ROM), USB memory, flash memory, and the like. One or more computer program modules can be stored on the computer-readable storage medium, and the processor 1210 can execute one or more computer program modules to achieve various functions of the electronic device 1200. Various application programs, various data, and various data used and/or generated by the application programs can also be stored in the computer-readable storage medium.

It should be noted that, in the embodiments of the present disclosure, the specific functions and technical effects of the electronic device 1200 can refer to the above description about the control method, which will not be repeated here.

Figure 13:
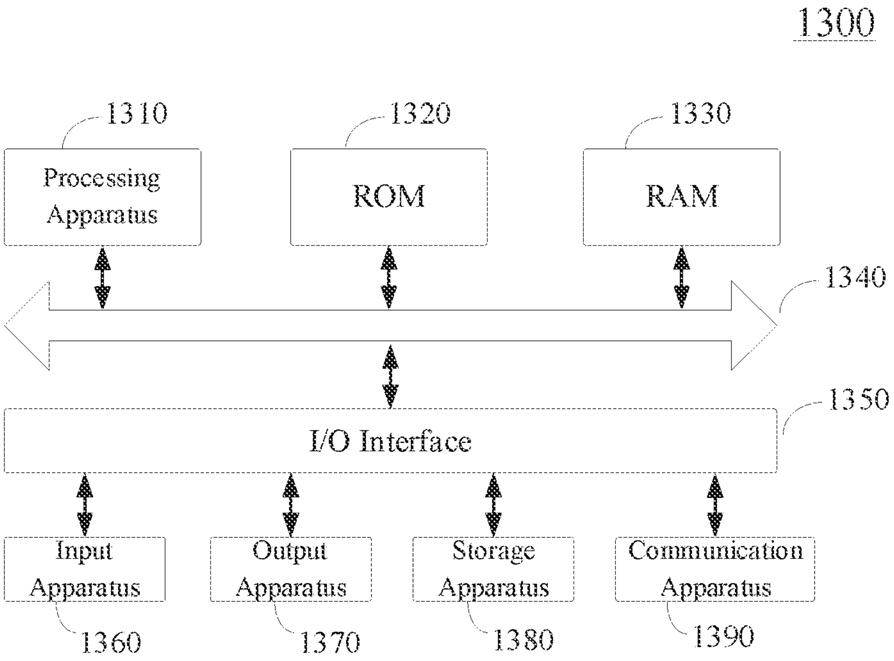
FIG. 13 illustrates a schematic block diagram of another electronic device provided by at least one embodiment of the present disclosure.

FIG. 13 illustrates a schematic block diagram of another electronic device provided by at least one embodiment of the present disclosure. The electronic device 1300 is, for example, suitable for implementing the control method provided by the embodiment of the present disclosure. The electronic device 1300 may be a terminal device or the like. It should be noted that the electronic device 1300 illustrated in FIG. 13 is only an example, which does not limit the functions and application scope of the embodiments of the present disclosure.

As illustrated in FIG. 13, the electronic device 1300 includes a processing apparatus 1310 (such as a central processing unit, a graphics processing unit, etc.) that can perform various appropriate actions and processes in accordance with a program stored in read-only memory (ROM) 1320 or loaded from a storage apparatus 1380 into random access memory (RAM) 1330. In the RAM 1330, various programs and data required for the operation of the electronic device 1300 are also stored. The processing apparatus 1310, the ROM 1320 and the RAM 1330 are connected to each other through a bus 1340. An input/output (I/O) interface 1350 is also connected to the bus 1340.

Usually, the following apparatus may be connected to the I/O interface 1350: an input apparatus 1360 including, for example, a touch screen, a touch pad, a keyboard, a mouse, a camera, a microphone, an accelerometer, a gyroscope, or the like; an output apparatus 1370 including, for example, a liquid crystal display (LCD), a loudspeaker, a vibrator, or the like; the storage apparatus 1380 including, for example, a magnetic tape, a hard disk, or the like; and a communication apparatus 1390. The communication apparatus 1390 may allow the electronic device 1300 to be in wireless or wired communication with other devices to exchange data. While FIG. 13 illustrates the electronic device 1300 having various apparatuses, it should be understood that not all of the illustrated apparatuses are necessarily implemented or included, and the electronic device 1300 may alternatively implement or have more or fewer apparatuses.

For example, according to the embodiments of the present disclosure, the control method described above can be implemented as a computer software program. For example, the embodiments of the present disclosure include a computer program product, which includes a computer program carried by a non-transitory computer-readable medium, and the computer program includes program codes for performing the control method described above. In such embodiments, the computer program may be downloaded online through the communication apparatus 1390 and installed, or may be installed from the storage apparatus 1380, or may be installed from the ROM 1320. When the computer program is executed by the processing apparatus 1310, the functions defined in the control method provided by the embodiments of the present disclosure can be achieved.

At least one embodiment of the present disclosure further provides a computer-readable storage medium for storing non-transitory computer-readable instructions, and when the non-transitory computer-readable instructions are executed by a computer, the above-mentioned control method is achieved. By using the computer-readable storage medium, the phase can be intelligently and dynamically selected according to real-time road conditions, thereby reducing the waiting time of vehicles, the queue length of vehicles, etc. as much as possible to achieve the purpose of optimizing traffic.

Figure 14:
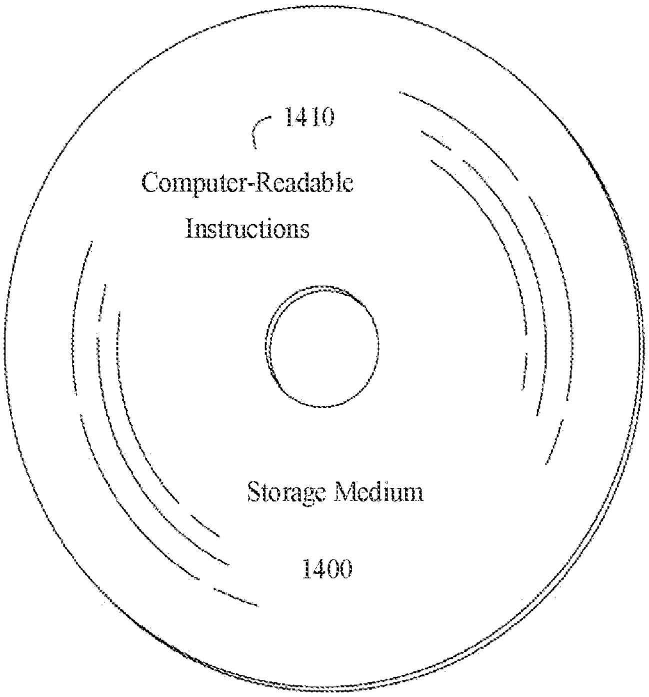
FIG. 14 illustrates a schematic diagram of a computer-readable storage medium provided by at least one embodiment of the present disclosure.

FIG. 14 illustrates a schematic diagram of a computer-readable storage medium provided by at least one embodiment of the present disclosure. As illustrated in FIG. 14, the storage medium 1400 is configured to non-transitorily store computer-readable instructions 1410. For example, when the computer-readable instructions 1410 are executed by a computer, one or more steps in the control method described above may be performed.

For example, the storage medium 1400 can be applied to the above-mentioned electronic device 1200. For example, the storage medium 1400 is the memory 1220 in the electronic device 1200 illustrated in FIG. 12. For example, the relevant descriptions about the storage medium 1400 can refer to the corresponding descriptions of the memory 1220 in the electronic device 1200 illustrated in FIG. 12, which will not be repeated here.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A control method of a traffic light in a road network, wherein the road network comprises a plurality of road sections and an intersection formed by the plurality of road sections, the traffic light is configured to regulate traffic at the intersection, and the control method comprises:

acquiring a piece of real-time road condition status information of the plurality of road sections connected to the intersection in the road network;

selecting a next hop phase of the traffic light from a plurality of preset phases of the traffic light according to the road condition status information; and controlling a phase of the traffic light to be updated to the next hop phase, wherein the control method further comprises:

providing the next hop phase to a map display page to cause the map display page to display the next hop phase.

2. The control method according to claim 1, further comprising:

judging whether there is an accident lane where a traffic accident occurs in the road network according to the road condition status information;

providing a piece of accident information of the traffic accident to the map display page in response to the presence of the accident lane in the road network, wherein the accident information comprises at least one selected from a group consisting of: an expected duration to pass through the accident lane, an expected duration for the traffic accident to be resolved, a piece of lane information of the accident lane, and a phase of a traffic light of an intersection connected to the accident lane;

wherein selecting the next hop phase of the traffic light from the plurality of preset phases of the traffic light according to the road condition status information comprises:

acquiring a processing strategy for the traffic accident in response to the presence of the accident lane in the road network; and selecting the next hop phase of the traffic light from the plurality of preset phases of the traffic light according to the processing strategy.

3. The control method according to claim 1, wherein the road condition status information comprises a piece of current driving information of each vehicle in the plurality of road sections, each of the plurality of road sections comprises at least one lane, and selecting the next hop phase of the traffic light from the plurality of preset phases of the traffic light according to the road condition status information comprises:

determining, for each of the plurality of preset phases, at least one first lane corresponding to each of the plurality of preset phases, wherein the at least one first lane corresponding to each of the plurality of preset phases is a lane of one or more vehicles released to arrive at the intersection for each of the plurality of preset phases;

calculating, according to a piece of current driving information of each vehicle in the at least one first lane, an expected delay duration generated by a vehicle in the at least one first lane if the vehicle is prohibited from passing when arriving at the intersection; and selecting the next hop phase of the traffic light from the plurality of preset phases of the traffic light according to the expected delay duration generated for each of the plurality of preset phases.

4. The control method according to claim 3, wherein selecting the next hop phase of the traffic light from the plurality of preset phases of the traffic light according to the expected delay duration generated by each of the plurality of preset phases comprises:

determining, according to the expected delay duration respectively generated for each of the plurality of preset phases, a release reward generated by releasing one or more vehicles arriving at the intersection in the at least one first lane for each of the plurality of preset phases; and selecting the next hop phase of the traffic light from the plurality of preset phases of the traffic light according to the release reward of each of the plurality of preset phases.

5. The control method according to claim 4, wherein in response to the traffic light being in different phases in two adjacent cycles, a later cycle of the two adjacent cycles is divided into a first stage and a second stage;

in the first stage, the traffic light indicates that all vehicles in the plurality of road sections are prohibited from passing through the intersection;

in the second stage, the traffic light indicates that one or more vehicles arriving at the intersection in at least some lanes in the plurality of road sections are released; and the expected delay duration comprises a first delay duration in the first stage and a second delay duration in the second stage.

6. The control method according to claim 5, wherein determining, according to the expected delay duration respectively generated for each of the plurality of preset phases, the release reward generated by releasing one or more vehicles arriving at the intersection in the at least one first lane for each of the plurality of preset phases, comprises:

judging, during a previous cycle of a current cycle of the traffic light, whether the traffic light releases the one or more vehicles arriving at the intersection in the at least one first lane;

in response to, during the previous cycle of the current cycle, releasing the one or more vehicles arriving at the intersection in the at least one first lane, and according to the first delay duration and the second delay duration of one or more vehicles in each of the at least one first lane, determining the release reward generated by releasing one or more vehicles arriving at the intersection in the at least one first lane; and in response to, during the previous cycle of the current cycle, not releasing the one or more vehicles arriving at the intersection in the at least one first lane, and according to the second delay duration of one or more vehicles in each of the at least one first lane, determining the release reward generated by releasing one or more vehicles arriving at the intersection in the at least one first lane.

7. The control method according to claim 6, wherein in response to, during the previous cycle of the current cycle, releasing the one or more vehicles arriving at the intersection in the at least one first lane, and according to the first delay duration and the second delay duration of one or more vehicles in each of the at least one first lane, determining the release reward generated by releasing one or more vehicles arriving at the intersection in the at least one first lane, comprises:

calculating a first sum and a second sum for each first lane, wherein the first sum is a sum of first delay durations of one or more vehicles arriving at the intersection in the first lane, and the second sum is a sum of second delay durations of the one or more vehicles arriving at the intersection in the first lane;

converting the sum of first delay durations and the sum of second delay durations into a first release reward and a second release reward according to weights of phases of releasing one or more vehicles in the first lane; and accumulating the first release reward and the second release reward of each of the at least one first lane to obtain the release reward generated by releasing the one or more vehicles arriving at the intersection in the at least one first lane;

wherein in response to, during the previous cycle of the current cycle, not releasing the one or more vehicles arriving at the intersection in the at least one first lane, and according to the second delay duration of one or more vehicles in each of the at least one first lane, determining the release reward generated by releasing one or more vehicles arriving at the intersection in the at least one first lane, comprises:

accumulating the second release reward of one or more vehicles in each of the at least one first lane to obtain the release reward generated by releasing the one or more vehicles arriving at the intersection in the at least one first lane.

8. The control method according to claim 4, wherein selecting the next hop phase of the traffic light from the plurality of preset phases of the traffic light according to a plurality of release rewards comprises:

selecting a phase with a largest release reward from the plurality of preset phases of the traffic light as the next hop phase of the traffic light; and wherein selecting the next hop phase of the traffic light from the plurality of preset phases of the traffic light according to the plurality of release rewards further comprises:

in response to the release reward being maximum for at least two phases, calculating, for each of the at least two phases, an expected delay duration during a next cycle of a current cycle in accordance with a phase of the traffic light during the next cycle of the current cycle being identical to a phase during the current cycle; and selecting a phase with a largest release reward during the next cycle from the plurality of preset phases of the traffic light as the next hop phase of the traffic light.

9. The control method according to claim 6, wherein calculating, according to the current driving information of each vehicle, the expected delay duration generated by a vehicle in the at least one first lane if the vehicle is prohibited from passing when arriving at the intersection, comprises:

acquiring a first duration required for each vehicle in the at least one first lane to reach the intersection according to the current driving information;

judging whether a second lane that each vehicle enters after passing through the intersection is congested;

judging whether the first duration is less than a second duration in response to the second lane not being congested, wherein the second duration is a duration of the first stage;

in response to the first duration being greater than or equal to the second duration and less than a total duration of one cycle of the traffic light, and the first delay duration when the second lane is not congested being equal to zero, the second delay duration when the second lane is not congested being equal to a difference between the total duration of one cycle of the traffic light and the first duration; and in response to the first duration being less than the second duration, obtaining the first delay duration $t_{v1}$ and the second delay duration $t_{v2}$ when the second lane is not congested according to following equations, respectively:

$$t_{v1} = t_{red} - t_r,$$

$$t_{v2} = t_{step} - t_r - t_{v1},$$

wherein $t_{red}$ is the second duration, the $t_r$ is the first duration, and $t_{step}$ is the total duration of one cycle of the traffic light;

wherein calculating, according to the current driving information of each vehicle, the expected delay duration generated by a vehicle in the at least one first lane if the vehicle is prohibited from passing when arriving at the intersection, further comprises:

acquiring a drivable duration of the each vehicle in the second lane in response to the second lane being congested, wherein the drivable duration is determined according to a drivable distance and a speed of the each vehicle;

judging whether the drivable duration is less than the first delay duration $t_{v1}$;

in response to the drivable duration being less than the first delay duration $t_{v1}$, obtaining a first delay duration $t'_{v1}$ and a second delay duration $t'_{v2}$ when the second lane is congested according to following equations, respectively:

$$t'_{v1} = \frac{dist_r}{r_n.\text{speed}},$$

$$t'_{v2} = t_{step} - t_{red},$$

wherein $dist_r$ is the drivable distance, and $r_n$·speed is a speed limit of the second lane; and in response to the drivable duration being greater than or equal to the first delay duration $t_{v1}$, and the first delay duration when the second lane is congested being equal to zero, calculating the second delay duration $t'_{v2}$ according to a following equation:

$$t'_{v2} = \frac{dist_r}{r_n.\text{speed}} - t'_{v1}.$$

10. The control method according to claim 8, wherein in response to the first duration $t_r$ being less than $2\times t_{step}$ and greater than or equal to $t_{step}$, the expected delay duration $t_{v3}$ during the next cycle of the current cycle is calculated according to a following equation:

$$t_{v3} = 2\times t_{step} - t_r.$$

11. The control method according to claim 9, further comprising:

acquiring statistical data of a plurality of historical cycles; and correcting the first duration according to the statistical data of the plurality of historical cycles;

wherein the statistical data comprises at least one first vehicle expected to be released in a statistical lane during a previous historical cycle of two adjacent historical cycles and at least one second vehicle expected to be released in the statistical lane during a later historical cycle of the two adjacent historical cycles, and correcting the first duration according to the statistical data of the plurality of historical cycles comprises:

in response to a target vehicle in the at least one first vehicle being also a vehicle in the at least one second vehicle, marking the target vehicle as a miscalculated vehicle;

determining an average error according to a speed of the miscalculated vehicle; and correcting the first duration according to the average error.

12. The control method according to claim 1, wherein selecting the next hop phase of the traffic light from the plurality of preset phases of the traffic light according to the road condition status information comprises:

inputting the road condition status information into a reward calculation model, and calculating, by the reward calculation model, a release reward obtained in a case where each of the plurality of preset phases is served as the next hop phase; and selecting the next hop phase of the traffic light from the plurality of preset phases of the traffic light according to the release reward of the each of the plurality of preset phases;

wherein the method further comprises:

acquiring a plurality of sets of training sample data, wherein each set of training sample data comprises a piece of historical road condition status information, the next hop phase of the traffic light, a release reward obtained by the traffic light changing to the next hop phase, and a piece of road condition status information after the traffic light changes to the next hop phase; and inputting the plurality of sets of training sample data to the reward calculation model to train the reward calculation model.

13. The control method according to claim 4, further comprising:

determining whether there are at least two interrelated congested lanes in the road network, wherein selecting the next hop phase of the traffic light from the plurality of preset phases of the traffic light according to the road condition status information comprises:

in response to the presence of the at least two interrelated congested lanes in the road network, determining a first traffic light and a second traffic light respectively corresponding to the at least two interrelated congested lanes;

finding a combined manner of a phase of the first traffic light and a phase of the second traffic light;

determining a combined release reward for the first traffic light and the second traffic light to respectively release part of lanes in the combined manner; and selecting, according to the combined release reward, a next hop phase of the first traffic light and a next hop phase of the second traffic light, respectively, from the plurality of preset phases of the traffic light;

wherein determining whether there are at least two interrelated congested lanes in the road network comprises:

acquiring, for each lane in the road network, a ratio of a traffic length in the lane to a length of the lane during a preset time period;

determining that the lane is a congested lane in response to the ratio being greater than a preset threshold;

in response to the presence of at least two congested lanes in the road network, determining whether traffic at intersections corresponding to the at least two congested lanes interact with each other; and in response to the traffic at intersections corresponding to the at least two congested lanes interacting with each other, determining the at least two congested lanes are interrelated.

14. The control method according to claim 1, wherein acquiring the real-time road condition status information of the road network comprises:

acquiring a piece of road network information of the road network and historical traffic flow data of the road network;

constructing a traffic simulation model according to the road network information and the historical traffic flow data; and outputting the real-time road condition status information of the road network by the traffic simulation model.

15. A control apparatus of a traffic light in a road network, wherein the road network comprises a plurality of road sections and an intersection formed by the plurality of road sections, the traffic light is configured to regulate traffic at the intersection, and the control apparatus comprises:

an acquisition unit, configured to acquire a piece of real-time road condition status information of the plurality of road sections connected to the intersection in the road network;

a selection unit, configured to select a next hop phase of the traffic light from a plurality of preset phases of the traffic light according to the road condition status information; and a control unit, configured to control a phase of the traffic light to be updated to the next hop phase, wherein the control apparatus further comprises:

a display unit, configured to provide the next hop phase to a map display page to cause the map display page to display the next hop phase.

16. A road network system, comprising:

a road network, comprising a plurality of road sections and an intersection formed by the plurality of road sections;

a traffic light, configured to regulate traffic at the intersection; and the control apparatus according to claim 15.

17. The road network system according to claim 16, wherein the control apparatus further comprises:

an adjustment unit, configured to acquire a piece of configuration information of the road network, and adjust the road network according to the configuration information;

wherein the configuration information comprises a piece of position information of the intersection in the road network and/or a total number of the plurality of preset phases of the traffic light;

wherein the adjustment unit is further configured to acquire a piece of control information of tidal lanes in the plurality of road sections, and regulate a driving direction of vehicles in the tidal lanes according to the control information.

18. An electronic device, comprising:

a processor;

a memory, comprising one or more computer program instructions, wherein the one or more computer program instructions are stored in the memory, and are capable of being executed by the processor to implement a control method of a traffic light in a road network, wherein the road network comprises a plurality of road sections and an intersection formed by the plurality of road sections, the traffic light is configured to regulate traffic at the intersection, and the control method comprises:

acquiring a piece of real-time road condition status information of the plurality of road sections connected to the intersection in the road network;

selecting a next hop phase of the traffic light from a plurality of preset phases of the traffic light according to the road condition status information; and controlling a phase of the traffic light to be updated to the next hop phase, wherein the control method further comprises:

providing the next hop phase to a map display page to cause the map display page to display the next hop phase.

19. A non-transitory computer-readable storage medium, storing one or more computer-readable instructions non-transitorily, wherein the one or more computer-readable instructions are capable of being executed by a processor to implement a control method of a traffic light in a road network, wherein the road network comprises a plurality of road sections and an intersection formed by the plurality of road sections, the traffic light is configured to regulate traffic at the intersection, and the control method comprises:

acquiring a piece of real-time road condition status information of the plurality of road sections connected to the intersection in the road network;

selecting a next hop phase of the traffic light from a plurality of preset phases of the traffic light according to the road condition status information; and controlling a phase of the traffic light to be updated to the next hop phase, wherein the control method further comprises:

providing the next hop phase to a map display page to cause the map display page to display the next hop phase.

* * * * *